United States Patent [19]
Yabusaki et al.

[11] Patent Number: 5,649,301
[45] Date of Patent: Jul. 15, 1997

[54] MOBILE COMMUNICATION METHOD FOR CONTROLLING ORIGINATION OR TERMINATION OF A CALL IN A DESIRED NETWORK

[75] Inventors: Masami Yabusaki, Iruma; Yasuo Maruyama, Yokosuka; Shoichi Hirata, Tokorozawa; Hiroshi Nakamura, Iruma; Yasuyuki Uchiyama, Chofu; Hiroshi Tsukahara, Tokorozawa; Eriko Takemoto, Tottori, all of Japan

[73] Assignee: NTT Mobile Communications Network, Inc., Tokyo, Japan

[21] Appl. No.: 244,944

[22] PCT Filed: Oct. 18, 1993

[86] PCT No.: PCT/JP93/01496

§ 371 Date: Jun. 17, 1994

§ 102(e) Date: Jun. 17, 1994

[87] PCT Pub. No.: WO94/09600

PCT Pub. Date: Apr. 28, 1994

[30] Foreign Application Priority Data

| Oct. 19, 1992 | [JP] | Japan | 4-279909 |
| Oct. 21, 1992 | [JP] | Japan | 4-282896 |
| Oct. 27, 1992 | [JP] | Japan | 4-288763 |
| Feb. 10, 1993 | [JP] | Japan | 5-022748 |
| Mar. 5, 1993 | [JP] | Japan | 5-044237 |
| May 24, 1993 | [JP] | Japan | 5-121050 |

[51] Int. Cl.$^6$ ............................................. H04B 7/24
[52] U.S. Cl. .................................................. 455/433
[58] Field of Search ........................ 455/33.1, 33.4, 455/53.1, 54.1, 54.2, 56.1; 379/58, 59, 62, 63, 60

[56] References Cited

U.S. PATENT DOCUMENTS

| 4,901,340 | 2/1990 | Parker et al. | 379/60 |
| 4,931,250 | 6/1990 | Greszczuk | 375/8 |
| 5,179,373 | 1/1993 | John | 340/825.15 |
| 5,307,400 | 4/1994 | Sawyer et al. | 379/59 |
| 5,335,265 | 8/1994 | Cooper et al. | 379/59 |
| 5,335,278 | 8/1994 | Matchett et al. | 380/23 |
| 5,353,331 | 10/1994 | Emery et al. | 379/58 |
| 5,432,841 | 7/1995 | Rimer | 379/59 |

OTHER PUBLICATIONS

Motorola An Introduction to the Pan European Digital Cellular Network.

Hoshi, M., et al., "Functional Reference Model for Universal Personal Telecommunication Service Studied by Considering Three Machines," *IEICE Transactions*, vol. E74, No. 11, Nov. 1991, pp. 3719–3725.

*Primary Examiner*—Reinhard J. Eisenzopf
*Assistant Examiner*—Lee Nguyen
*Attorney, Agent, or Firm*—Pollock, Vande Sande & Priddy

[57] ABSTRACT

In a mobile communication network, a mobile unit location register ML and a subscriber location register SL are provided. In the mobile unit location register the mobile location of a mobile unit MT is registered, whereas in the subscriber location register a mobile unit MT selected by each subscriber SB as a terminal for call terminating use is registered. Upon receiving a terminating call for a subscriber, a switching center SW reads out, from the subscriber location register SL, an identifying number TID of the mobile unit registered by the subscriber SB as a terminal for call terminating use and uses the mobile unit identifying number TID to read out the mobile location of the mobile unit MT from the mobile unit location register ML, thereafter sending the terminating call to the registered mobile unit of the read-out mobile location.

8 Claims, 14 Drawing Sheets

MOBILE COMMUNICATION METHOD FOR CONTROLLING ORIGINATION OR TERMINATION OF A CALL IN A DESIRED NETWORK

TECHNICAL FIELD

The present invention relates to a communication control method in a mobile communication system which enables a subscriber to originate or terminate a call through any given mobile unit in an arbitrary mobile communication network through utilization of his personal number.

PRIOR ART

In mobile communication, a location register is provided in the mobile radio communication network and is covered by a plurality of base stations in the network. Even if a mobile unit freely moves across a plurality of areas, its visited area is always updated in the location register. Hence, when receiving a terminating call for a mobile unit anywhere in the mobile communication network, a switching center is capable of terminating the call at its destination unit by reading out its visited area from the location register, sending the call to the base station of that area and transmitting it therefrom to the mobile unit over a radio channel. With this method, however, users suffer an inconvenience that they are allowed to receive terminating calls only by their own mobile units.

It is now demanded to implement a mobile communication system wherein each subscriber registers his service information with the mobile communication network whenever necessary and the network effects call control for the subscriber by referring to his registered service information to allow him to use an arbitrary mobile unit for communication. Where the area over which the mobile communication service is offered is made up of a plurality of mobile communication networks by different service providers, it will be convenient that the subscriber belonging to one of the mobile radio communication networks is allowed to originate and terminate calls in the other networks as well. To meet this requirement, there has been proposed such a system as described below. In the following description, the mobile communication network to which the subscriber belongs will be referred to as a home network and the mobile communication network into which the subscriber moves from the home network will be referred to as a roaming network.

Every mobile unit (a portable telephone or car phone, for example) receives services specified in the contract with the company operating the mobile communication network. To carry out the services, each mobile unit is assigned a mobile unit identifying number and various pieces of information on the mobile unit, similar to those mentioned above, are prestored in the location register in the network to which the subscriber belongs. To receive call originating and call incoming services in a mobile communication network to which the mobile unit does not belong, that is, in the roaming network, it is necessary to access the mobile unit contract information and other similar information, but it is inefficient to access the home network for each call; it is customary in the prior art to transfer hence, all or some pieces of mobile unit contract information and similar information from the location register of the home network to the counterpart of the roaming network.

Conventionally, when the subscriber roams into a mobile communication network other than the home network, his fixed and unmodified contract information (including information about the subscriber and information about the mobile unit) is transferred from a visitor location register of the home network to the counterpart of the roaming network. In the roaming network, at the time of performing the call originating and terminating process for the subscriber, his contract information is referred to in the visitor location register of the roaming network to permit a mobile originated or terminated call in the roaming network. However, no proposals have been made regarding how effect changes of service such as incoming call forwarding, call waiting and temporary interruption of incoming call.

In the implementation of a communication system (a personal mobile communication system) which allows the subscriber to originate a call or receive an incoming call through an arbitrary mobile unit registered for receiving calls in an arbitrary mobile communication network through use of his personal number, the location of the subscriber is registered in the roaming network whenever he moves into the network. However, there has not been proposed any method which efficiently implements a terminal connection for the subscriber using, as a receiving terminal, the mobile unit having its location registered in the roaming network.

Nor has been there proposed a method which enables the subscriber to originate a call in a mobile communication network to which he has not reported his movement thereinto.

Moreover, in a personal mobile communication system wherein the personal number of the same subscriber is shared by a plurality of subscribers, there is a problem that when two subscribers of the same personal number simultaneously perform processing for registration in the visitor location register from different mobile units, they may sometimes compete, causing a contradiction to arise in the registered contents of the visitor location register.

Furthermore, the above communication system is defective in that in the case of cancelling the registration of all the subscribers of each mobile unit, all the registered subscriber numbers need to be reported from the mobile unit to the communication network.

When the specifications of communication terminals (including all communication terminals except mobile units) are updated for enhancement of system capabilities, communication terminals of different communication procedures are mixed in a certain communication network; in this instance, the communication network has no means for learning the communication procedure of each communication terminal, and hence there may be cases where the communication network cannot determine what communication procedure is followed to perform processing for communication from the communication terminal, making the communication impossible.

DISCLOSURE OF THE INVENTION

A first object of the present invention is to provide a mobile communication control method which enables a called subscriber to receive a terminating call in a mobile communication system which allow subscribers to freely select mobile units.

A second object of the present invention is to provide a mobile communication control method which makes it possible that a subscriber having his personal number continuously receives through an arbitrary mobile unit communication services changeable at any time in an arbitrary roaming network to which the subscriber does not belong.

A third object of the present invention is to provide a mobile communication control method which efficiently implements terminating connection to a subscriber using, as a receiving terminal, a location-registered mobile unit in a roaming network.

A fourth object of the present invention is to provide a mobile communication control method which allows a subscriber to originate a call from a network different from his current roaming network.

A fifth object of the present invention is to provide a communication registration control method with which it is possible that, when there are a plurality of requests for registration of one communication terminal in a personal mobile communication wherein the personal number of the same subscriber is shared by a plurality of subscribers, the registrations takes place in the order in which the requests are made.

A sixth object of the present invention is to provide a communication registration control method which precludes the necessity of reporting from a mobile unit to the communication network all subscriber numbers registered with the mobile unit when cancelling their registration.

A seventh object of the present invention is to provide a communication registration control method with which it is possible that even if communication terminals of different communication procedures are mixed in the communication network as the result of updating the specifications of the communication terminals, the call setup process is performed following the communication procedure corresponding to the updated specifications.

According to a first aspect of the present invention, a mobile unit location register and a subscriber location register are provided in the mobile communication network, the mobile locations of mobile units are registered with the mobile unit location register and the mobile unit selected by each subscriber as a receive terminal is registered with the subscriber location register. When receiving a terminating call for a subscriber, a switching center reads out of the subscriber location register the identifying number of the mobile unit registered by the subscriber as the receive terminal, then reads out its mobile location from the mobile unit location register by use of the mobile unit identifying number and sends the terminating call to the registered mobile unit at the read-out mobile location.

According to a second aspect of the present invention, subscriber modifying information changeable by the subscriber at any time as well as subscriber contract information are prestored in a visitor location register of the roaming network. At the time of originating or terminating a call, such prestored information is used to perform the call set up process. When the subscriber has roamed into another network, the subscriber contract information and the subscriber modifying information are transferred to the roaming network.

According to a third aspect of the present invention, a subscriber location register, which stores, for each subscriber, subscriber information and information about the mobile unit registered by the subscriber for receiving calls, is provided in each mobile communication network. The mobile unit location register is provided with means for detecting every subscriber having registered the mobile unit for terminating calls. When the mobile unit moves into another mobile communication network and registers its location for the first time in the network, the mobile unit location register having received a location registration signal from the mobile unit detects, by the subscriber detecting means, the subscriber having registered for receiving calls with the mobile units which has transmitted the location registration signal. The subscriber information for the subscriber having registered for receiving calls is transferred from the subscriber location register of the previous mobile communication network to the subscriber location register of the new mobile communication network.

According to a fourth aspect of the present invention, in the case of making a request for originating a call in a network other than the visited network of the mobile unit registered by the subscriber for terminating calls, since his subscriber information has not been transferred to the visitor location register of the mobile communication network in which the origination of a call is requested, the exchange obtains via a home location register the subscriber information necessary for the call originating process from the visitor location register of the network registered for terminating calls, thereafter performing the call originating process for the subscriber.

According to a fifth aspect of the present invention, in the case of registering with the location register, an advance reservation for registration is made with the location register, and after the reservation is confirmed, the registration is made and then the reservation is cancelled.

According to a sixth aspect of the present invention, the identifying numbers of subscribers who have registered with each mobile unit for receiving calls are prestored in the mobile unit location register and by reporting the identifying number of the mobile unit therefrom to the mobile unit location register, the registrations of the plurality of subscribers registered with the mobile unit for receiving calls are all cancelled.

According to a seventh aspect of the present invention, a terminal class indicating the communication capability of each communication terminal is prestored in a location register and read out therefrom when originating or receiving a call and used to perform communication processing corresponding to the terminal.

BEST MODE FOR CARRYING OUT THE INVENTION

Figure 1:
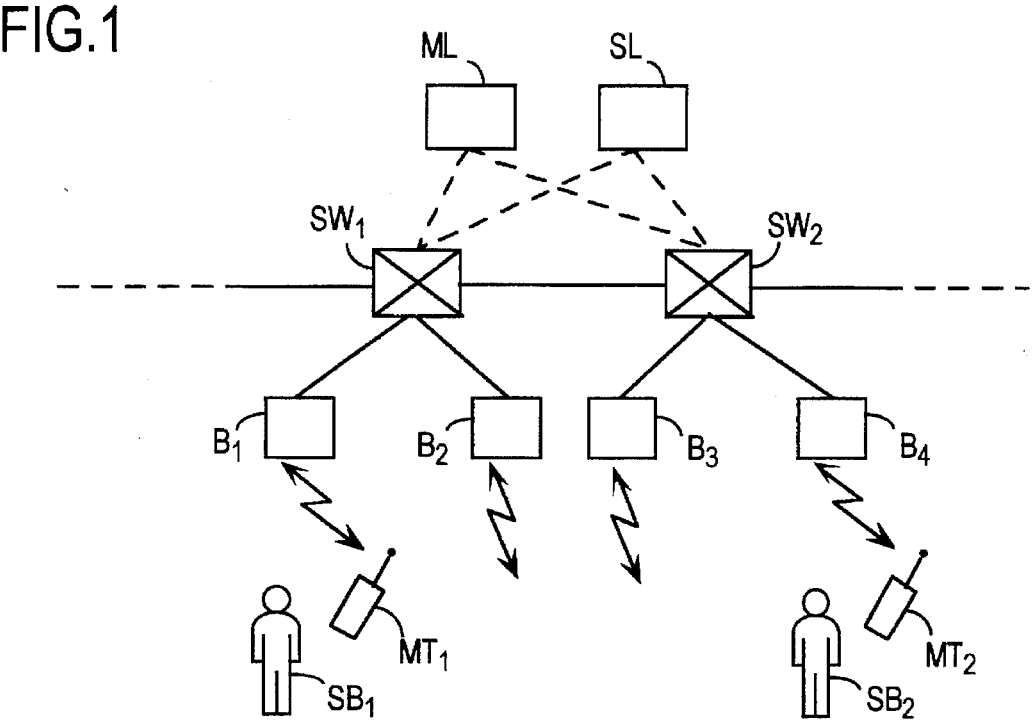
FIG. 1 is a block diagram illustrating an example of a mobile communication system employing the communication control method according to the first aspect of the present invention.
Figure 2:
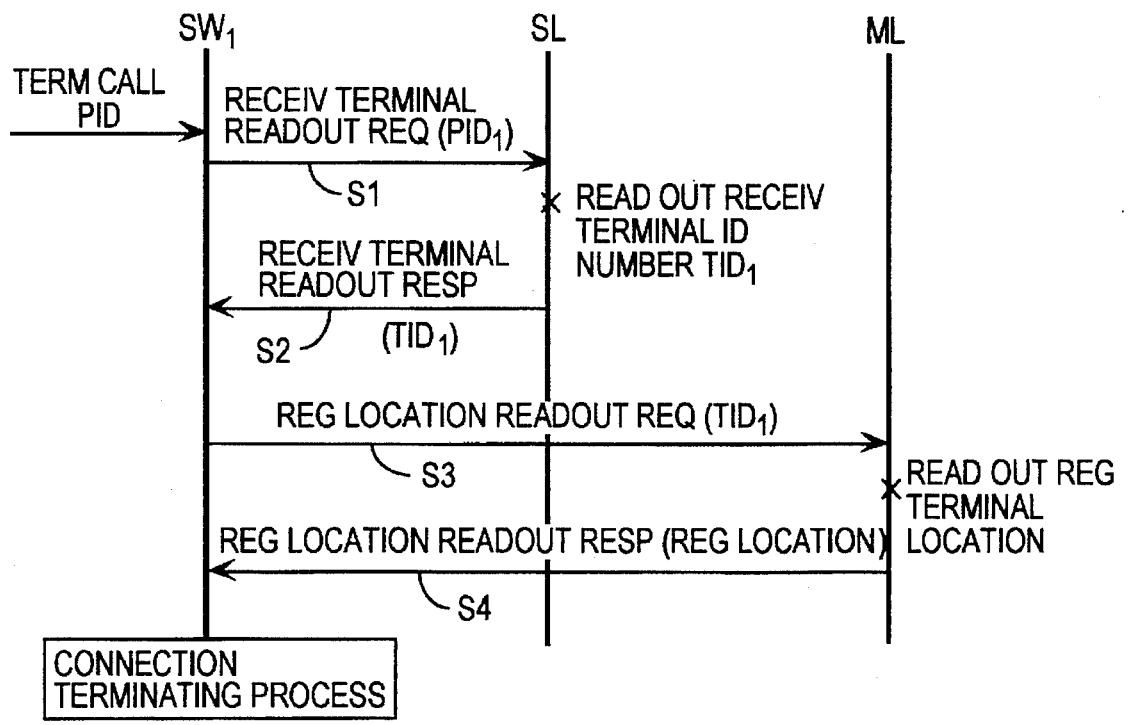
FIG. 2 is a diagram showing the procedure for performing the communication control method according to the first aspect of the present invention.

A mobile communication system according to the first aspect of the present invention is illustrated in FIG. 1 and a mobile communication control method for the mobile communication system is depicted in FIG. 2. In the mobile communication network there are provided a mobile unit location register ML and a subscriber location register SL. Switching centers $SW_1$ and $SW_2$ are connected via control line to the location registers ML and SL, and base stations $B_1, B_2, B_3$ and $B_4$ are connected to each exchange. The base stations $B_1$ through $B_4$ cover, by communication, areas assigned to them, respectively. Mobile units $MT_1, MT_2, MT_3, \ldots$ and subscribers $SB_1, SB_2, SB_3, \ldots$ contracting for receiving mobile communication services are assigned identifying numbers $TID_1, TID_2, TID_3, \ldots$ and $PID_1, PID_2, PID_3, \ldots$, respectively, and they are registered in the mobile unit location register ML and the subscriber location register SL, respectively.

When a switching center makes a request for origination connection, it sends these identifying numbers. These identifying numbers include specific numbers (addresses) of the mobile unit location register ML and the subscriber location register SL in which these identifying numbers in the mobile communication network are registered; therefore, it is possible to access the location registers of the home network from a different mobile communication network connected thereto as well.

In this embodiment, there are registered in the mobile unit location register ML visited areas (roaming areas) of the mobile units $MT_1, MT_2, \ldots$ in correspondence to their identifying numbers $TID_1, TID_2, \ldots$ as in the conventional mobile communication system. According to the present invention, however, the subscriber location register SL is provided, in which there are registered identifying numbers of mobile units selected by subscribers as receiving terminals in correspondence to the subscriber identifying numbers $PID_1, PID_2, \ldots$. The receiving terminal registration takes place in such a way as mentioned below.

For example, when the subscriber $SB_1$ performs a receiving terminal registration operation by inputting his identifying number $PID_1$ into the mobile unit $MT_1$ from the mobile unit $MT_1$ selected for receiving use, a receiving terminal registration request signal including the subscriber identifying number $PID_1$ and the mobile unit identifying number $TID_1$ is fed via the base station $B_1$ to the switching center $SW_1$. The exchange $SW_1$ sends the receiving terminal registration request signal to the subscriber location register SL in accordance with its address indicated in the subscriber identifying number $PID_1$. The subscriber location register SL uses the received subscriber identifying number $PID_1$, as an address, to write the mobile unit identifying number $TID_1$ in its internal memory at the corresponding storage location.

Next, a description will be given, with reference to FIG. 2, of a process for the connection of a terminating call for the subscriber $SB_1$. Upon receiving the terminating call for the subscriber $SB_1$, the switching center $SW_1$ sends to the subscriber location register SL a receiving terminal readout request signal including the subscriber identifying number $PID_1$ on the basis of the number $PID_1$ included in the terminating call (step S1). The subscriber location register SL responds to the readout request signal to read out from its internal memory the identifying number $TID_1$ of the registered receiving terminal, using the identifying terminal $PID_1$ as an address, and sends it as a response signal to the switching center $SW_1$ (step S2). The exchange $SW_1$ sends to the mobile unit location register ML a registered location readout request signal including the identifying number $TID_1$ contained in the received response signal (step S3). Based on the mobile unit identifying number $TID_1$, the mobile unit location register reads out the corresponding registered location and sends it as a response signal to the switching center $SW_1$ (step S4). The switching center $SW_1$ sends the terminating call to the base station $B_1$ corresponding to the received registered location, using as its destination the mobile unit identifying number $TID_1$ received in step S2. Thus, the mobile unit $MT_1$ is allowed to receive the terminating call for the subscriber $SB_1$.

Figure 3:
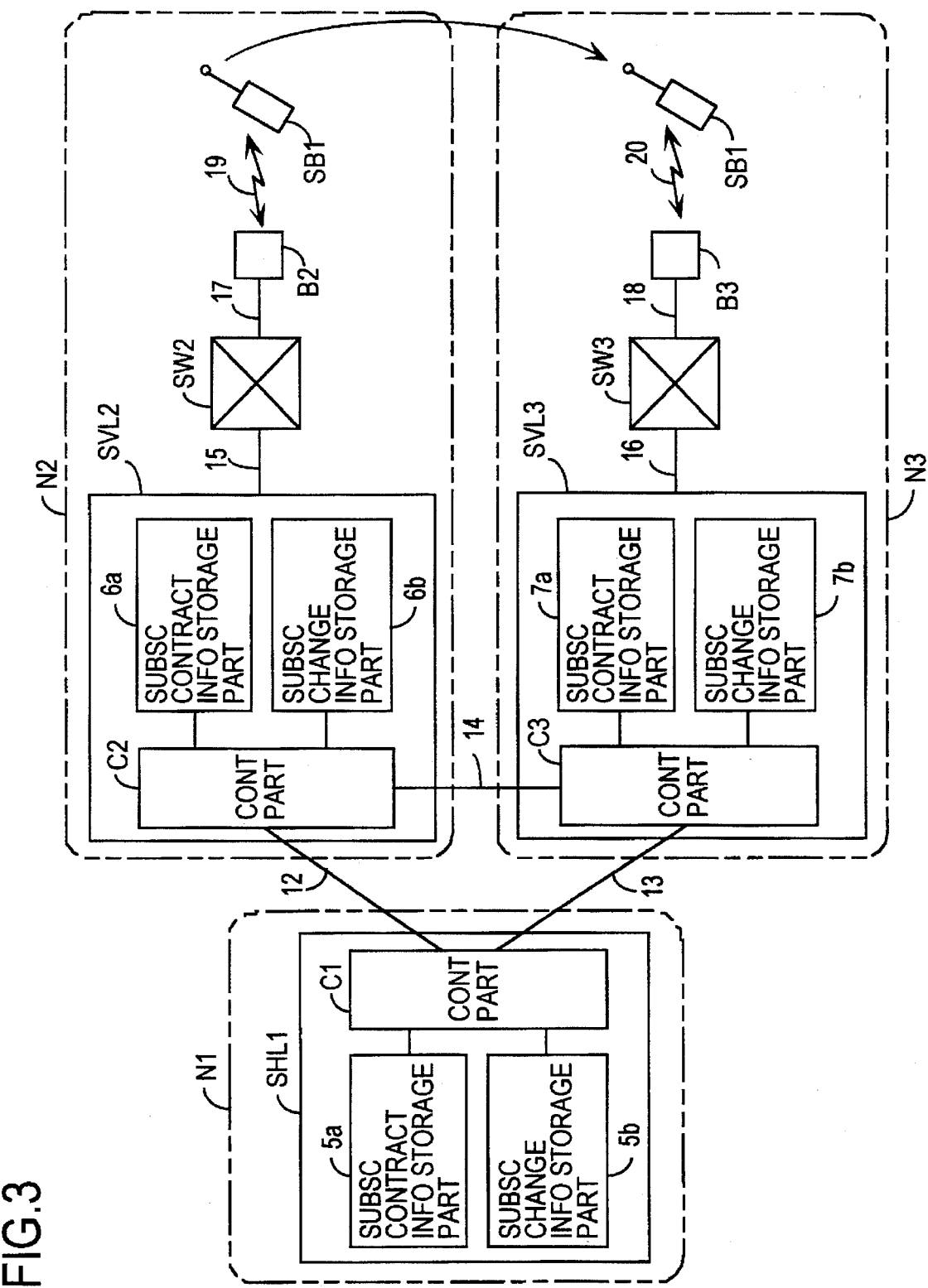
FIG. 3 is a block diagram illustrating an example of a mobile communication system employing the control method according to the second aspect of the present invention.

In FIG. 3 there is shown an example of a mobile radio communication system employing the mobile communication control method according to the second aspect of the present invention which enables a subscriber of a certain communication network to receive services changeable at any time even if he moves into a communication network to which he does not belong.

In FIG. 3 there are shown mobile communication networks N1, N2 and N3. In each of the mobile communication networks N1 through N3 there are provided a home location register SHL for subscribers belonging to the network and a visitor location register SVL for subscribers not belonging to the network. In FIG. 3, however, only a home location register SHL1 is shown in the mobile communication network N1 to which a mobile subscriber SB1 belongs and only visitor location registers SVL2 and SVL3 are shown in the other mobile communication networks N2 and N3, respectively. The visitor location registers SVL2 and SVL3 are connected to switching centers SW2 and SW3 in the respective networks via control lines 15 and 16, and the switching centers exchanges SW2 and SW3 are connected to base stations B2 and B3 in the respective networks via control lines 17 and 18, and hence are allowed to hold communications with mobile units (mobile subscribers) MT in the networks N2 and N3 via the base stations B2 and B3. In each of the communication networks N2 and N3, there are usually provided pluralities of exchanges and base stations. Similarly, switching centers and base stations are provided also in the communication network N1, though not shown, and the switching centers are capable of communicating with the mobile units in the network. It is possible to interconnect the home location register and the visitor location register or the visitor location registers via control lines between different communication networks. In FIG. 3, the home location register SHL1 and the visitor location registers SVL2 and SVL3 are interconnected via control lines 12 and 13, respectively, and the visitor location registers SVL2 and SVL3 are interconnected via a control line 14.

Also in the mobile communication to which the present invention is applied, as is the case with personal communications, each subscriber contracts with a company operating a mobile communication network desired to use for receiving preselected kinds of services and the subscriber is given a subscriber identifying number (hereinafter referred to as a personal number). By registering his desired mobile terminal as a terminal for call receiving use, the subscriber is allowed to receive a terminating or incoming call at the registered mobile terminal. In the case of originating a call from a desired mobile terminal of the communication network, the subscriber always sends his subscriber number from the mobile terminal, by which he can receive the contracted service and is billed for the service. Furthermore, it is possible for the subscriber to receive additional services following the contract. To provide such various services for each subscriber in accordance with the contract, various pieces of information about the subscriber are prestored in the location registers in the network, and upon each call setup processing for the subscriber, the pieces of information stored in the location registers are referred to and the required service is offered.

Typical pieces of information necessary for providing such services are such as listed below.
(a) Call originating permit/inhibit information: Indicating whether to permit the subscriber to originate a call.
(b) Call incoming permit/inhibit information:
    Indicating whether to permit the subscriber to receive an incoming call.
(c) Contract/non-contract information for each addition service:
    Indicating whether the subscriber has contracted for an incoming call forwarding service and a call waiting service, for instance.
(d) Billing information, billing detail information
(e) Boot/non-boot information for each additional service:
    Indicating whether the incoming call forwarding service or call waiting service is being booted in the case where the subscriber has contracted therefor. When the incoming call forwarding service is booted, an incoming call forwarding destination number is also stored.
(f) Identifying number of the mobile unit registered for receiving calls Of the above-mentioned pieces of information, the pieces of information (a), (b) and (c) are not changed unless the subscriber changes the contract, and hence they will hereinafter be referred to as subscriber contract information. The information (d) is administrative information resulting from the call setup processing service for the subscriber and are not directly related to the present invention. The pieces of information (e) and (f) are changeable in response to a request of the subscriber, and hence they will hereinafter be referred to as subscriber changeable information. The pieces of information (a) through (f) will hereinafter be generically called subscriber information.

In FIG. 3, there is fixedly stored in a subscriber contract information storage part 5a of the home location register SHL1 the subscriber contract information about each subscriber SB belonging to the mobile communication network N1. In a subscriber changeable information storage part 5b, the subscriber changeable information is temporarily stored.

In subscriber contract information storage parts 6a and 7a of the visitor location registers SVL2 and SVL3 are stored pieces of subscriber contract information about roaming subscribers who do not belong to the networks N2 and N3 but stay therein. In subscriber changeable information storage parts 6b and 7b are stored the pieces of subscriber changeable information of the subscribers who do not belong to but stay in the networks N2 and N3.

A control part C1 of the home location register SHL1 transmits and receives control signals to and from the visitor location registers SVL2 and SVL3. A control part C2 of the visitor location register SVL2 generates control signals (request signals) or response signals and transmits and receives them to and from the home location register SHL1, the visitor location register SVL2 and the switching center SW2, and the control part C2 writes information into the subscriber contract information storage part 6a and the subscriber changeable information storage part 6b, reads out therefrom the information, or erases it. A control part C3 of the visitor location register SVL3 also generates control signals or response signals and transmits and receives them to and from the home location register SHL1, the visitor location register SVL2 and the switching center SW3, and the control part C3 writes information into the subscriber contract information storage part 7a and the subscriber changeable information storage part 7b, reads out therefrom the information, or erases it.

Figure 4:
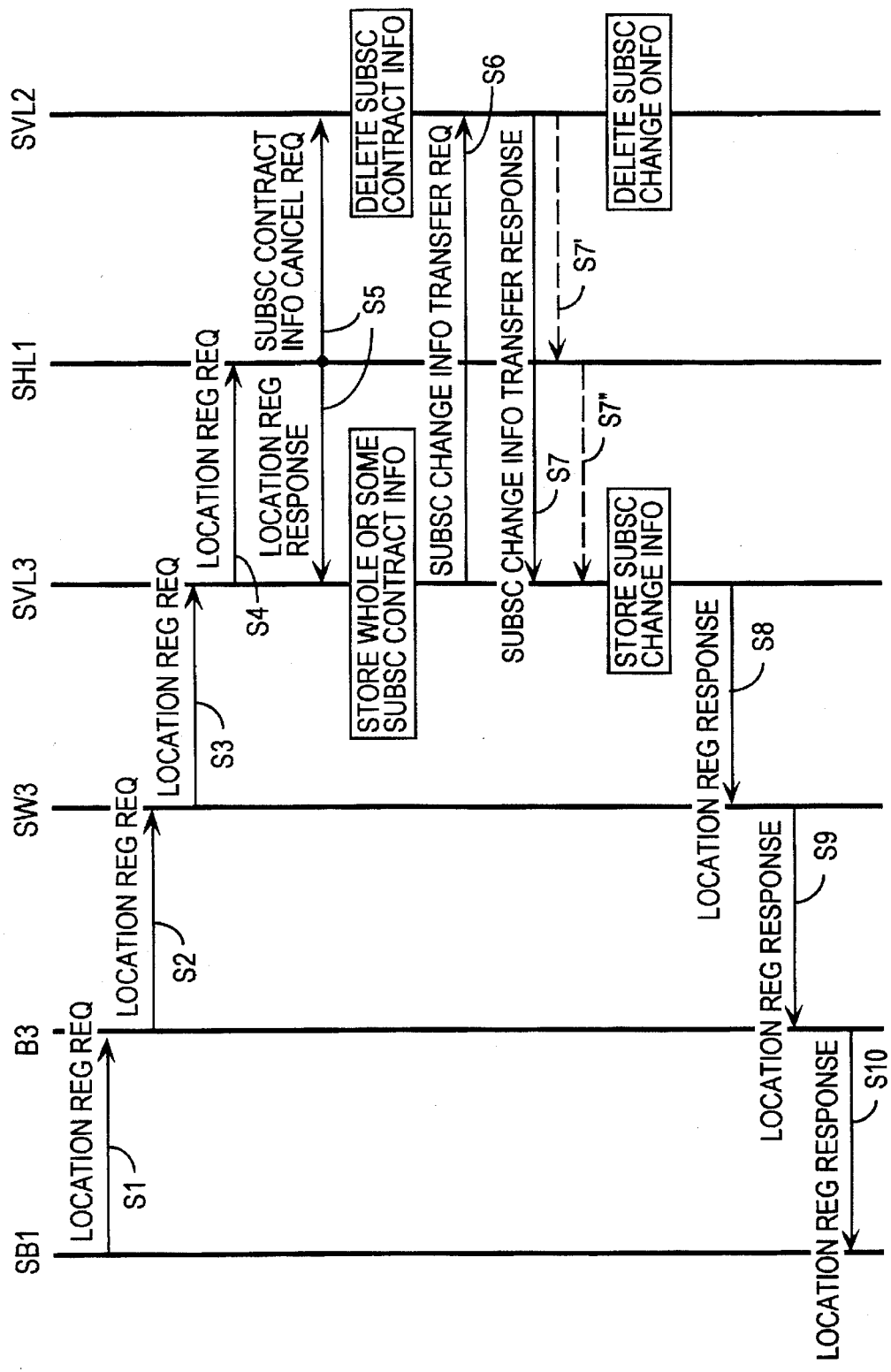
FIG. 4 is a diagram showing a communication control sequence according to the second aspect in the system of FIG. 3.

FIG. 4 shows a sequence of steps involved in the location registration in the case where the subscriber SB1, accommodated in (belonging to) the mobile communication network N1 of the mobile radio communication system of FIG. 3, moves into the network N3 from the network N2. Referring now to FIGS. 3 and 4, the operation of the present invention will be described.

Every subscriber is given a subscriber identifying number and, for example, two high-order digits indicate the network (the home network) to which the subscriber belongs. The subscriber transmits his identifying number PID whenever he originates a call from within an arbitrary network.

When the subscriber SB1 moves into the mobile communication network Ns from the network N2, then detects its information broadcast from the base station B3 over a control channel 20 and thus recognizes his movement into the network N3, the roaming subscriber SB1 sends a "location registration request" signal to the base station B3 over the control channel 20 (step S1). Upon receiving the "location registration request" signal from the roaming subscriber SB1, the base station B3 sends it to the switching center SW3 via the control line 18 (step S2). The switching center SW3 identifies the visitor location register SVL3 wherein the subscriber contract information and subscriber changeable information of the roaming subscriber SB1 are to be stored, then sends the "location registration request" signal to the visitor location register SVL3 via the control line 16 (step S3). Since the subscriber contract information and subscriber changeable information corresponding to the roaming subscriber SB1 are not found in the visitor location register SVL3, the control part C3 judges that the location registration of the subscriber SB1 is a first one after he moves into the communication network N3, then detects the home network number indicated in the identifying number of the roaming subscriber SB1 and sends the "location registration request" signal via the control line 13 to the home location register SHL1 of the subscriber SB1 (step S4).

Upon receiving the "location registration request" signal from the visitor location register SVL3, the control part C1 in the home location register SHL1 reads out from the subscriber contract information storage part 5a all or some pieces of subscriber contract information of the subscriber concerned and sends, as a "location registration response" signal, to the visitor location register SVL3 via the control line 13 a duplicated version of the read-out subscriber contract information and the identifying number of the visitor location register SVL2 which has stored therein the subscriber contract information and subscriber changeable information of the subscriber SB1 in the mobile communication network N2 where the subscriber SB1 had stayed before he moved therefrom into the network N3 (step S5). Furthermore, the home location register SHL1 sends to the visitor location register SVL2 a signal for erasing therefrom the subscriber contract information of the subscriber SB1 (step S5).

The control part C3 in the visitor location register SVL3 stores the duplicated information of all or some pieces of the subscriber contract information read out of the home location register SHL1, in the subscriber contract information storage part 7a in correspondence to the roaming subscriber SB1. Moreover, the control part C3 of the visitor location register SVL3 sends via the control line 14 to the visitor location register SVL2 of the immediately preceding roaming network N2 of the subscriber SB1, reported from the home location register SHL1, a "subscriber changeable information transfer request" signal which requests the visitor location register SVL2 to transfer the subscriber changeable information thereon to the visitor location register SVL3 (step S6). This request signal includes also a command for the visitor location register SVL2 to erase therefrom the subscriber changeable information after transferring it to the visitor location register SVL3.

Upon receiving the "subscriber changeable information transfer request" from the visitor location register SVL3, the visitor location register SVL2 sends thereto, as a "subscriber changeable information transfer response" signal, the subscriber changeable information of the subscriber SB1 stored in the visitor location register SVL2 (step S7). Simultaneously with the transmission of this signal, the control part C2 erases the subscriber changeable information of the subscriber SB1 in the subscriber changeable information storage part 6b. Upon receiving the "subscriber changeable information transfer response" signal from the visitor location register SVL2, the control part C3 of the visitor location register SVL3 stores in the register SVL3 the subscriber changeable information of the subscriber SB1 contained in the received signal. The visitor location register SVL3 sends a "location registration response" signal to the switching center SW3 (step S8). Upon receipt of this signal, the switching center SW3 sends a location registration response" signal to the base station B3 (step S9). The base station B3, in turn, a "location registration response" signal to the roaming subscriber SB1 (step S10).

In the above example, at the time of location registration after the subscriber SB1 moves into the mobile communication network N3 from the network N2, the subscriber changeable information of the roaming subscriber SB1 is transferred directly from the visitor location register SVL2 to the register SVL3. It is also possible, however, to transfer the subscriber changeable information of the subscriber SB1 from the visitor location register SVL2 to the home location register SHL1 (step S7') and thence to the visitor location register SVL3 (step S7") as indicated by the broken lines in FIG. 4. In this instance, the subscriber changeable information can be transferred from the home location register SHL1 after removing therein information about services that are not provided in the mobile communication network N3, for instance.

In the above-described mobile communication system, when the communication network registered before the location registration or call reception registration in a new network is the communication network (the home network) to which the subscriber belongs, the subscriber changeable information is also transferred from the home location register to the visitor location register concerned. Conversely, when the subscriber returns to the communication network (the home network) to which he belongs, only the subscriber changeable information needs to be transferred to the home location register from the visitor location register of the immediately preceding network.

As described above, according to this embodiment, when the subscriber moves into a new communication network, at least one part of the subscriber contract information is transferred from the home location register to the visitor location register of the new network; consequently, there is no fear of false information being transferred and only required pieces of subscriber contract information can be transferred in accordance with the service that the new communication network offers.

Besides, the selection of an additional service or suspension of its start which can be changed by the subscriber, for example, the destination of a terminating call or temporal terminating call interruption, may sometimes be changed while the subscriber stays in the communication network, and it is preferable that the changed state be held even if the subscriber moves into a new communication network, because the service quality is not degraded. In this embodiment, since the subscriber changeable information is transferred from the visitor location register of the immediately preceding communication network, the subscriber can freely change the service without impairing its quality and can receive a service involving a change; thus, the quality of service can be improved.

Next, a description will be given of an embodiment of the mobile communication control method according to the third aspect of the present invention. With this control method, upon occurrence of an incoming or terminating call in a roaming network after the location registration by the subscriber, the corresponding subscriber information is not transferred from his home network, but instead the subscriber information is read out from a subscriber location register of the roaming network and is used to perform processing for the subscriber to receive the incoming call.

Figure 5B:
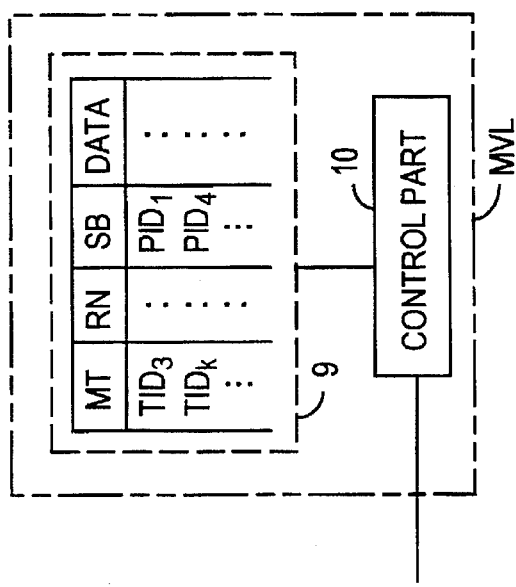
FIG. 5B is a block diagram illustrating an example of the construction of each mobile unit location register in FIG. 5A.
Figure 5A:
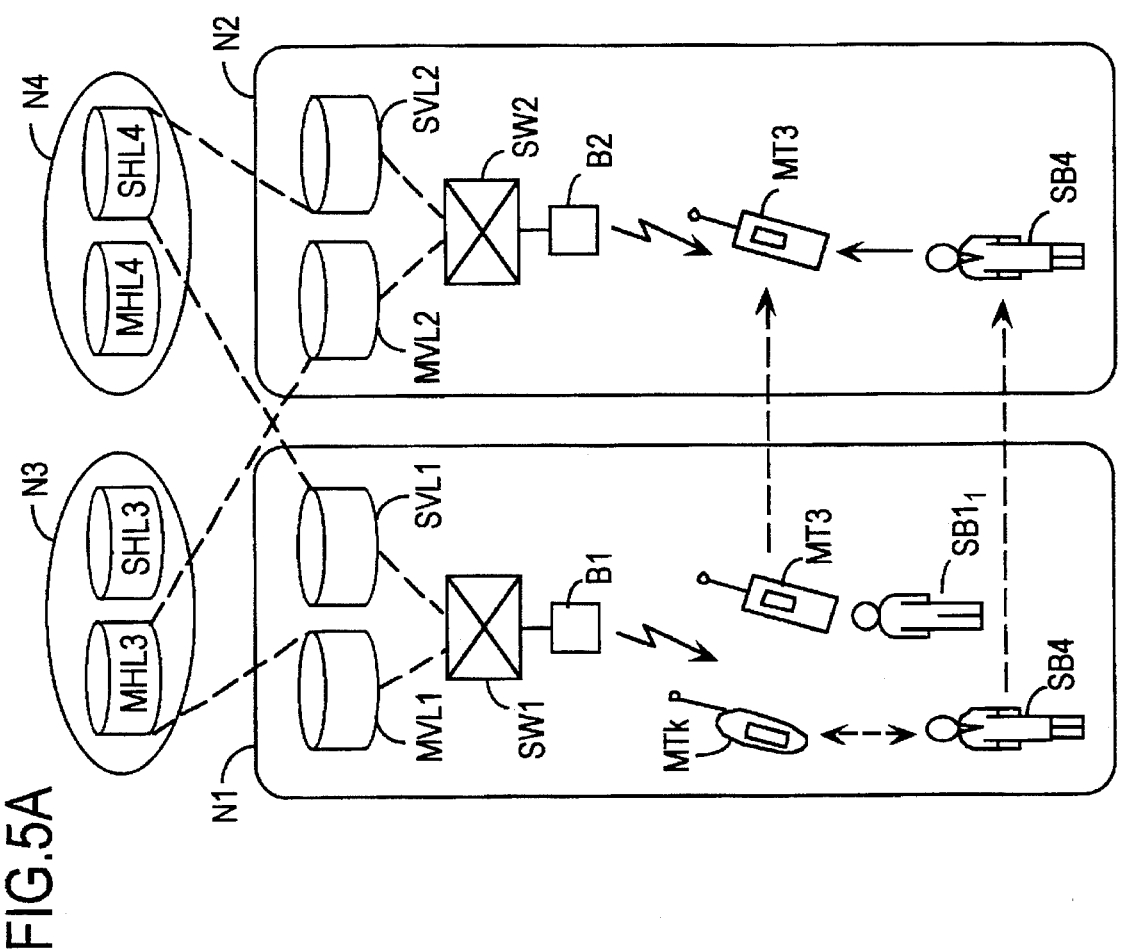
FIG. 5A is a diagram showing an example of the configuration of a mobile communication network employing the control method according to the present invention.

FIG. 5A illustrates a mobile communication network, for explaining the embodiment according to the third aspect of the invention. There are provided mobile communication networks N1, N2, N3 and N4; in the mobile communication networks N1 and N2 there are provided base stations B1 and B2, which are connected to switching centers SW1 and SW2, respectively. Although switching centers and base stations are provided in the mobile communication networks N3 and N4 as well, they are not shown. In practice, pluralities of switching centers and base stations are provided in each mobile communication network. In the mobile communication networks N1 through N4 there are provided mobile unit home location registers MHL1 through MHL4, mobile unit visitor location registers. MVL1 through MVL4, subscriber home location registers SHL1 through SHL4 and subscriber visitor location registers SVL1 through SVL4, but for the sake of simplicity, only the location registers MVL1, SVL1, MVL2, SVL2, MHL3, SHL3, MHL4 and SHL4 are shown in FIG. 5A.

In each of the mobile unit home location registers MHL1 through MHL4 of the networks N1 through N4 there are stored mobile location information and mobile unit information of the mobile units belonging to the network, and in each of the mobile unit visitor location registers MVL1 through MVL4 there are stored the number of each subscriber having registered a mobile unit roaming in the network for receiving calls and information about the registered mobile unit. The mobile unit location registers MVL1 through MVL4 and MHL1 through MHL4 are each provided with a mobile unit memory 9 for storing mobile unit information and a control part 10 for controlling respective parts, as shown in FIG. 5B. In the case of detecting the subscriber having registered the mobile unit for receiving calls, the home network of the registered mobile unit is identified by its mobile unit number, then the current visited network of the mobile unit is read out from the mobile unit home location register of its home network and then the subscriber is identified by reading out necessary information from the mobile unit visitor location register of the visited network.

Figure 6:
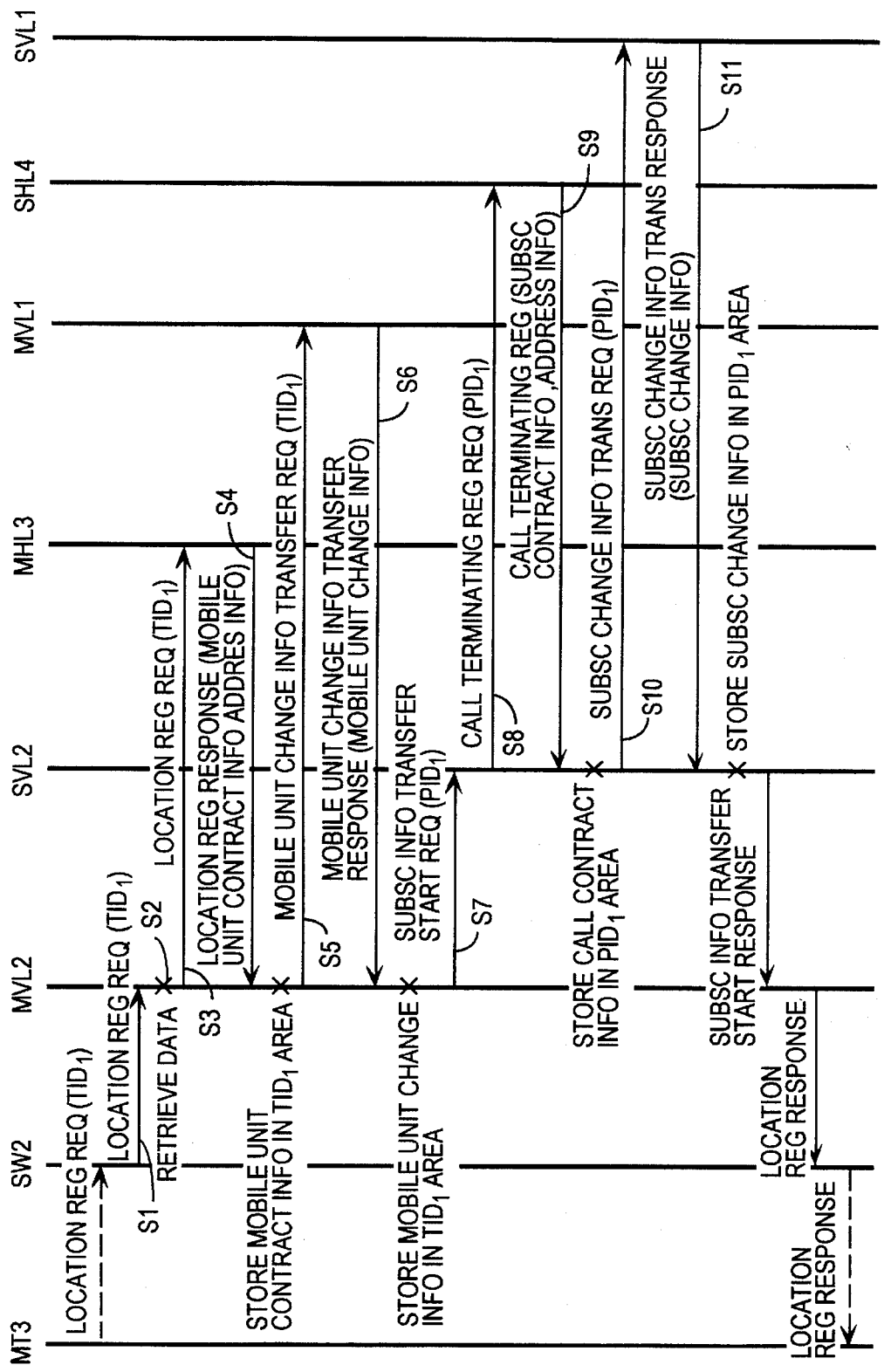
FIG. 6 is a diagram showing an example of a location registration sequence in the control method according to the third aspect of the present invention.

Next, an example of operation of the present invention will be described with reference to FIG. 6 which shows a sequence of steps involved in the location registration in the mobile communication system of FIG. 5A. Consider that a mobile unit MT3 belonging to the mobile network N3 in FIG. 5A moves (roams) into the mobile communication network N2 from the network N1. Let it be assumed that the mobile unit information about the mobile unit MT3 is normally stored in the mobile unit home location register MHL3 in the mobile communication network N3 which is the home network of the mobile unit MT3. Furthermore, assume that a subscriber SB4, who has registered the mobile unit MT3 for receiving calls, belongs to the mobile communication network N4 and that subscriber information about the subscriber SB4 is normally stored in the subscriber home location register SHL4 in the mobile communication network N4. A description will be given first, with reference to FIGS. 5A and 6, of an example of the procedure for location registration at the time of mobile unit roaming in the mobile communication network utilizing the present invention.

In FIG. 5A, when the mobile unit MT3 roams into the mobile communication network N2 from the network N1 and in the area covered by the base station B2 the mobile unit MT3 transmits thereto a location registration signal including its mobile unit number (similarly indicated by MT3), the base station B2 sends a base station number indicating its coverage area and the above-mentioned location registration signal to the mobile unit visitor location register MVL2 via the switching center SW2 (step S1).

Upon receiving the location registration signal, the control part 10 of the mobile unit visitor location register MVL1 retrieves the mobile unit information of the mobile unit MT3 from the mobile unit memory 9 on the basis of the mobile unit number contained in the location registration signal (step S2). In this case, since the location registration of the mobile unit MT3 has not been made after its roaming into the current network from the network N1, no mobile unit information of the mobile unit MT3 is present in the mobile unit memory 9. To access the mobile unit home location register MHL3 of the home network N3 which normally stores the mobile unit information about the mobile unit MT3 on the basis of its home network number indicated by the mobile unit number of the mobile unit MT3, the control part 10 generates an inter-network location registration request signal including the mobile unit number of the mobile unit MT3 and sends the request signal to the mobile unit home location register MHL3 (step S3).

Upon receiving the inter-network location registration request signal, the mobile unit home location register MHL3 retrieves the mobile unit information of the mobile unit MT3 by use of the mobile unit number included in the received request signal. At the same time, to access the mobile unit visitor location register wherein there is recorded the number of the subscriber who has registered the mobile unit MT3 for call receiving use most recently, the mobile unit home location register MHL3 reads out the number RN of the mobile communication network N1 which is the roaming network of the mobile unit MT3 (immediately preceding the current network N2) and was written at the time of the previous location registration. Suppose that once the number of each mobile communication network is known, addresses of its mobile unit location register and subscriber location register are known from a table. The mobile unit home location register MHL3 thus obtains address information of the mobile unit visitor location register MVL1 in the mobile communication network N1 and sends to the mobile unit visitor location register MVL2 an inter-network location registration response signal including the above-mentioned mobile unit information and address information (step S4). At the same time, the address RN of the roaming network of the mobile unit MTS in the mobile unit home location register MHL3 is changed from the address for the network N1 (or register MVL1) to that for the network N2 (or register MVL2).

Upon receiving the inter-network location registration response signal, the control part 10 of the mobile unit visitor location register MVL2 records in the mobile unit memory 9 the mobile unit information contained in the received signal. Furthermore, to obtain the subscriber number of the subscriber SB4 who has registered the mobile unit MT3 for call receiving use from the mobile unit visitor location register MVL1 on the basis of its address information contained in the received signal, the control part 10 generates a registered subscriber inquiry request signal containing the mobile unit number of the mobile unit MT3 and sends the request signal to the mobile unit visitor location register MVL1 (step S5).

Upon receiving the registered subscriber inquiry request signal, the mobile unit visitor location register MVL1 accesses the mobile unit information of the mobile unit MT3 through use of its mobile unit number contained in the received signal to obtain the subscriber number of the subscriber SB4 having registered the mobile unit MT3 for call receiving use and sends to the mobile unit visitor location register MVL2 a registered subscriber inquiry response signal composed of the subscriber number and the mobile unit number of the mobile unit MT3 (step S6). In the above it is assumed that only the subscriber SB4 has registered the mobile unit MT3 for call receiving use, but in the case where a plurality of subscribers have registered the mobile unit MT3 for call receiving use, a registered subscriber inquiry response signal containing all of the subscribers is sent to the mobile unit visitor location register MVL2.

Upon receiving the above-mentioned registered subscriber inquiry response signal, the control part 10 of the mobile unit visitor location register MVL2 writes the subscriber number included in the received signal into the mobile unit information about the mobile unit MT3 stored in the mobile unit memory 9. In the case where the identifying number of the subscriber who has registered the mobile unit MT3 for call receiving use is included in the received mobile unit change information, a subscriber information transfer start request signal containing the subscriber identifying number is generated and sent to the subscriber visitor location register SVL2 (step S7).

Upon receiving the above-said subscriber information transfer start request signal, the subscriber visitor location register SVL2 sends a subscriber information transfer request signal (a call reception registration request signal), which includes a number (a visited network number) indicating the mobile communication network N2 which is used as information for routing an incoming call for the subscriber SB4 to the mobile communication network N2 and the subscriber number of the subscriber SB4, to the subscriber home location register SHL4 provided in the mobile communication network N4 to which the subscriber SB4 belongs (step S8). Incidentally, this example is described in connection with the case where only one subscriber number is contained in the subscriber information transfer start request signal (mobile unit change information), but when a plurality of subscriber numbers are contained in the request signal, the following process is repeated by the number of times corresponding to subscriber numbers contained in the signal.

Upon receiving the above-said call reception registration request signal, the subscriber home location register SHL4 accesses the subscriber information of the subscriber SB4 through use of his subscriber number included in the received signal and stores the number RN of the roaming mobile communication network N2, while at the same time the location register SHL4 reads out the subscriber information of the subscriber SB4 and sends a call reception registration response signal including the read-out information to the subscriber visitor location register SVL2 (step S9).

Upon receiving the call reception registration response signal, the subscriber visitor location register SVL2 stores the subscriber information included in the received signal and writes into the subscriber information the mobile unit number included in the afore-mentioned registered subscriber inquiry request signal. Following this, a series of steps similar to S6 through S10 in FIG. 4 are carried out, then completing the location registration process incident to the roaming of the mobile unit MT3 into the mobile communication network N2.

Figure 7A:
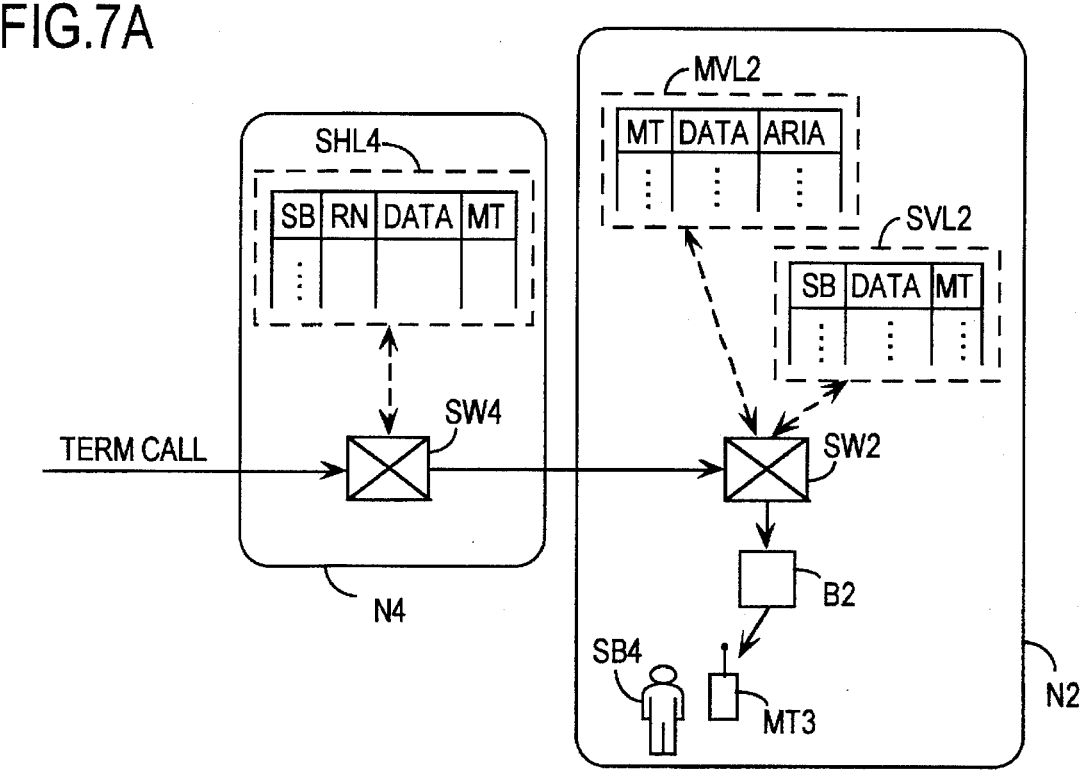
FIG. 7A is a diagram showing an example of a call receiving operation in the control method according to the third aspect of the present invention.
Figure 7B:
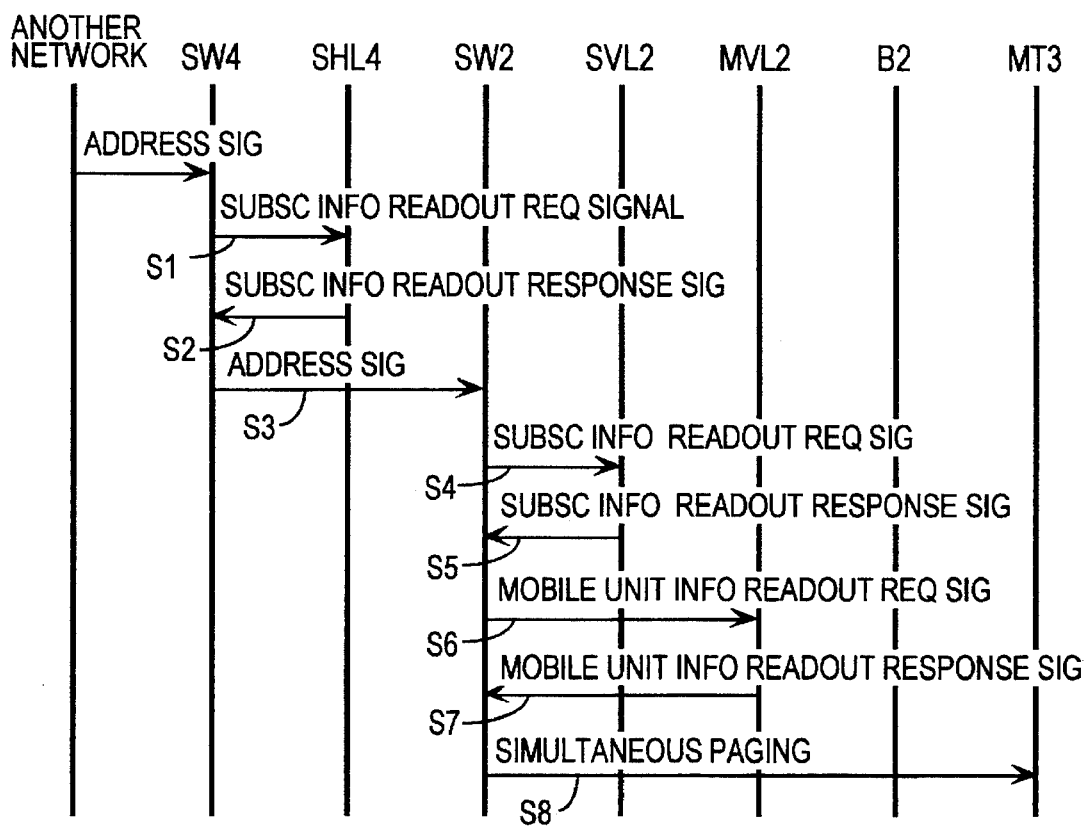
FIG. 7B is a diagram showing an example of a call receiving control sequence in FIG. 7A.

As described above, according to the present invention, since the subscriber information of the subscriber is transferred to and stored in the subscriber visitor location register of the mobile communication network at the time of location registration, the subsequent terminating call processing for the subscriber becomes simple. Referring now to FIGS. 7A and 7B, this will be described in connection with the case of controlling a terminating call for the subscriber SB4.

The terminating call for the subscriber SB3 is routed first to the mobile communication network N4 to which the subscriber SB4 belongs, based on the home network number indicated in the call receiving subscriber number included in the terminating call. When the call arrives at the switching center SW4 in the mobile communication network N4, the switching center SW4 sends to the subscriber home location register SHL4 a subscriber information readout request signal including the subscriber number of the subscriber SB4 (step S1). Upon receiving the signal, the subscriber home location register SHL4 accesses the subscriber information of the subscriber SB4 through use of the subscriber number included in the received signal, then reads out a visited network number assigned to the subscriber SB4 and sends a subscriber information readout response signal including the read-out visited network number to the switching center SW4 (step S2).

Upon receiving the above subscriber information readout response signal, the switching center SW4 sends an address signal, which includes the visited network number and the subscriber number of the subscriber SB4 included in the received signal, to the mobile communication network N2 which is the current visited network of the subscriber SB3, thereby setting up a communications line to the switching center SW2 in the mobile communication network N2 (step S3). The method for setting up the communications line from the switching center SW4 to SW2 is the same as that used to set up communications lines in conventional communication networks. Incidentally, the visited network number is used as information for routing to the switching center SW2.

When supplied with the above-mentioned address signal, the switching center SW2 accesses the subscriber visitor location register SVL2 through use of the subscriber number included in the received address signal (step S4) and obtains the subscriber information of the subscriber SB4 (step S5). Furthermore, based on the mobile unit number of the mobile unit MT3 registered by the subscriber SB4 for call receiving use, which is contained in the above-said subscriber information, the switching center SW2 accesses the mobile unit visitor location register MVL2 (step S6) and obtains therefrom the mobile unit information of the mobile unit MT3 and its location information (the number of the base station covering the area where the mobile unit MT3 stays) (step S7). After this, the switching center SW2 uses this location information to call the mobile unit MT3 (step S8).

As described above, according to this embodiment, the terminating call for the subscriber can be routed directly from the mobile communication network to which the subscriber belongs to the current visited mobile communication network. This precludes the necessity of routing the call through the mobile unit home network, permits reduction of the connection delay and does not require a line to the mobile communication network (the mobile unit home network) to which the mobile unit registered by the subscriber for call receiving use belongs. Besides, the subscriber information need not be transferred upon each occurrence of a terminating call; hence, the line usage efficiency increases.

Next, the mobile communication control method according to the fourth aspect of the present invention, which enables the subscriber to originate a call in a mobile communication network different from the current visited network of the mobile unit registered by the subscriber for call receiving use (that is, the network registered for call receiving use), will be described as being applied to the mobile communication system depicted in FIG. 5A. In this embodiment, the mobile communication networks N1, N2, ... are designed so that pieces of subscriber information of subscriber who do not belong to the respective networks can also be stored in the subscriber visitor location registers SVL1, SVL2, .... Every subscriber is given his identifying number, which can be used to identify the mobile communication network to which the subscriber belongs.

In this embodiment, though not shown, in particular, the subscriber visitor location registers SVL1, SVL2, ... are provided with storage parts which store subscriber information of subscribers having registered terminals in the respective mobile communication networks N1, N2, ... for call receiving use and belonging to other communication networks and control parts which control reading and writing of information, transmission and reception of signals, etc.

When the subscriber SB who belongs to the mobile communication network N4 transmits from a mobile unit MTk in another communication network N1 a request for registering the mobile unit MTk as a call receiving terminal, the switching center SW1 reports it to the subscriber visitor location register SVL1. Since the subscriber visitor location register SVL1 has not stored the subscriber information of the requesting subscriber, it makes a request for transferring his subscriber information from the subscriber home location register SHL4 of the mobile communication network N4 to which the subscriber SB4 belongs, and the subscriber visitor location register SVL1 stores therein the subscriber information thus transferred thereto.

Figure 8:
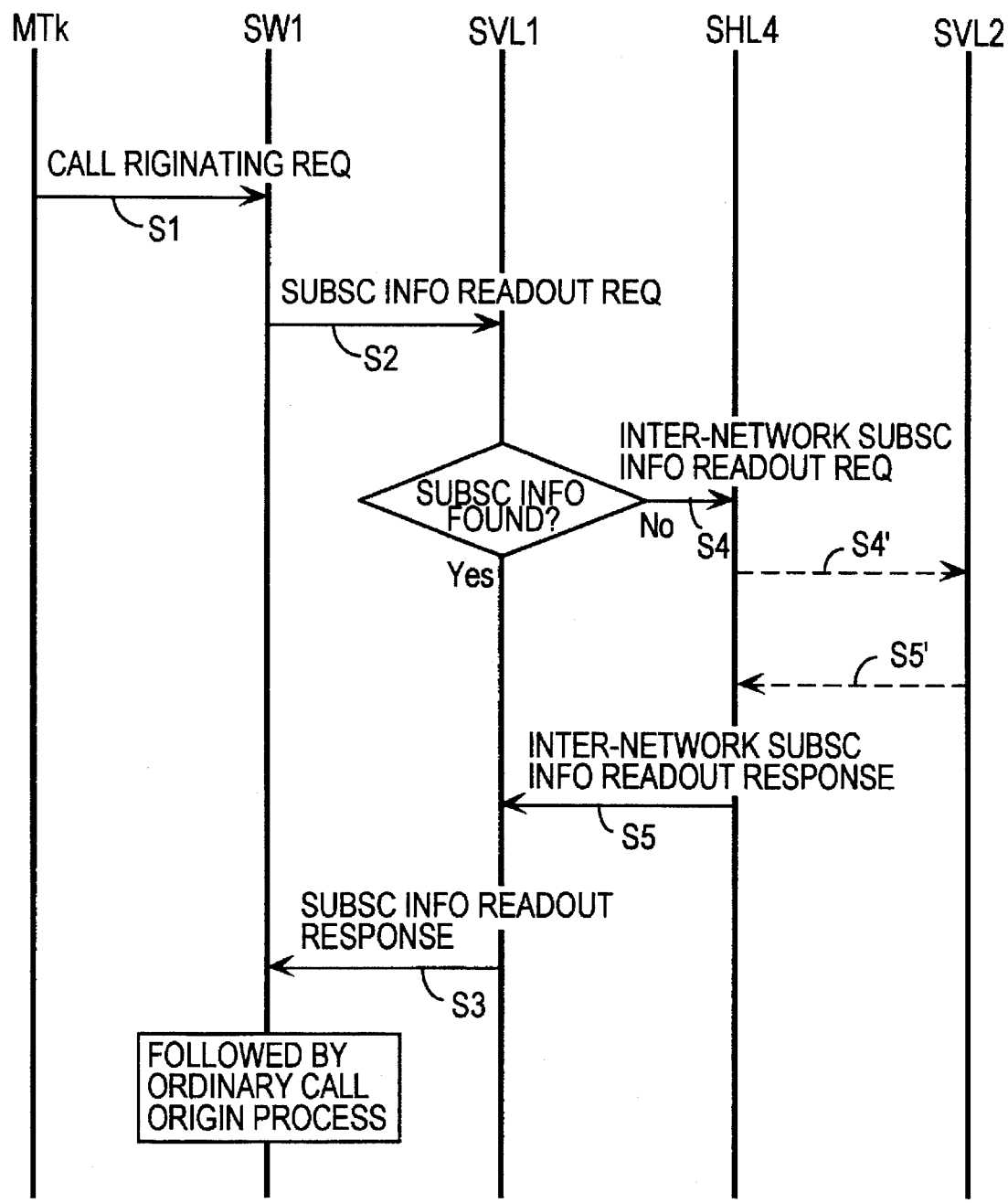
FIG. 8 is a diagram showing an example of a sequence of operations for a call originating process involving an information transfer to a location register by the control method according to the fourth aspect of the invention.

With such a system configuration, those subscribers who are under a contract for receiving mobile communication services in any one of the mobile communication networks N1, N2, ... are allowed to originate and terminate calls in other communication networks than their home networks as well. FIG. 8 shows a call originating control sequence.

When the subscriber SB4, who is under the contract for receiving mobile communication services in the mobile communication network N4, moves into the communication network N1 and inputs his subscriber identifying number into the mobile unit MTk to initiate the call originating procedure, the mobile unit MTk sends to the switching center SW1 a call originating request including the subscriber identifying number assigned to the subscriber concerned (step S1).

The switching center SW1 judges, from the subscriber identifying number contained in the request, that the subscriber is a subscriber (a roaming user) belonging to another network, and to obtain subscriber information necessary for the call originating process, the switching center SW1 sends a subscriber information readout request signal, which includes the subscriber identifying number of the originating subscriber, to the subscriber visitor location register SVL1 in which the subscriber information of the roaming user is stored (step S2).

Upon receiving the subscriber information readout request signal, the subscriber visitor location register SVL1 retrieves the subscriber information through use of the subscriber identifying number included in the received request signal. When the corresponding subscriber information is found, the subscriber visitor location register SVL1 generates a subscriber information readout response signal including the read-out subscriber information and sends it to the requesting switching center SW1 (step S3). When receiving the subscriber information readout response signal, the switching center SW1 performs a usual call originating process by use of the subscriber information included in the received signal.

On the other hand, when the requested subscriber information is not found in the subscriber visitor location register SVL1, the register detects the address of the subscriber home location register SHL4 from the subscriber identifying number of the subscriber concerned, then generates an inter-network subscriber information readout request signal including the subscriber identifying number and sends the request signal to the subscriber home location register SHL4 (step S4).

Upon receiving this signal, the subscriber home location register SHL4 reads out the requested subscriber information through use of the subscriber identifying number included in the signal, then sends an inter-network subscriber information readout response signal, which includes the read-out subscriber information, to the subscriber visitor location register SVL1 and, at the same time, stores the number of the new roaming network N1 of the subscriber (step S5). The subscriber visitor location register SVL1 receives the response signal, generates a subscriber information readout response signal including the subscriber information contained in the received response signal, then sends the response signal to the switching center SW1 (step S3) and, at the same time, stores the subscriber information in the visitor location register SVL1.

The switching center SW1 receives the above-mentioned subscriber information readout response signal and performs the call originating process for the subscriber.

When the previous roaming network N2 of the subscriber SB4 is included in the subscriber information read out by the subscriber home location register SHL4 in response to the readout request signal received in step S4, the inter-network subscriber information readout request signal is transferred to the subscriber visitor location register SVL2 of the roaming network N2 (step S4'). The subscriber visitor location register SVL2 responds to the request signal to read out the subscriber information in the roaming network N2 of the subscriber SB4 and sends the read-out information as an inter-network subscriber information readout response signal to the subscriber home location register SHL4 (step S5'). The subscriber home location register SHL4 transfers the received inter-network subscriber information readout response signal to the subscriber visitor location register SVL1 (step S5), which, in turn, transfers the received subscriber information readout response signal to the switching center SW1 (step S3). The switching center SW1 uses the subscriber information included in the received signal to perform the call originating process for the subscriber SB4.

While in the above this embodiment has been described as being applied to the mobile communication system, it may also be applied to a personal communication system. That is, in the mobile communication system the subscriber can register a terminal at any place for call receiving use; also in the personal communication system this can be done by regarding a mobile unit as the subscriber and making the location registration of the mobile unit to correspond to the call terminating registration. Although in the above the subscriber home location register and the subscriber visitor location register are provided independently of each other, they may also be mixed in one location register or separated in terms of area. In some cases, the subscriber information may be transferred directly from the home location register to the requesting switching center SW1.

As described above, according to this embodiment, the subscriber information of a subscriber belonging to another communication network is also stored in the subscriber visitor location register—this enables the subscriber to originate and terminate calls in communication networks other than his home network, providing improved services. Besides, even in the case where the call terminating registration or mobile location registration has not been made in other communication networks, if the subscriber originates a call, his subscriber information is obtained from the location register of the communication network to which the subscriber belongs, and the call originating process is carried out accordingly.

Next, a description will be given of an embodiment of the mobile communication control method according to the fifth aspect of the present invention which resolves a contention or registration error which occurs when a plurality of subscribers, who share the same subscriber identifying number, try to make the terminating terminal registration at substantially the same time in the mobile communication system wherein a predetermined number of subscribers are allowed to share the same subscriber identifying number.

Figure 9:
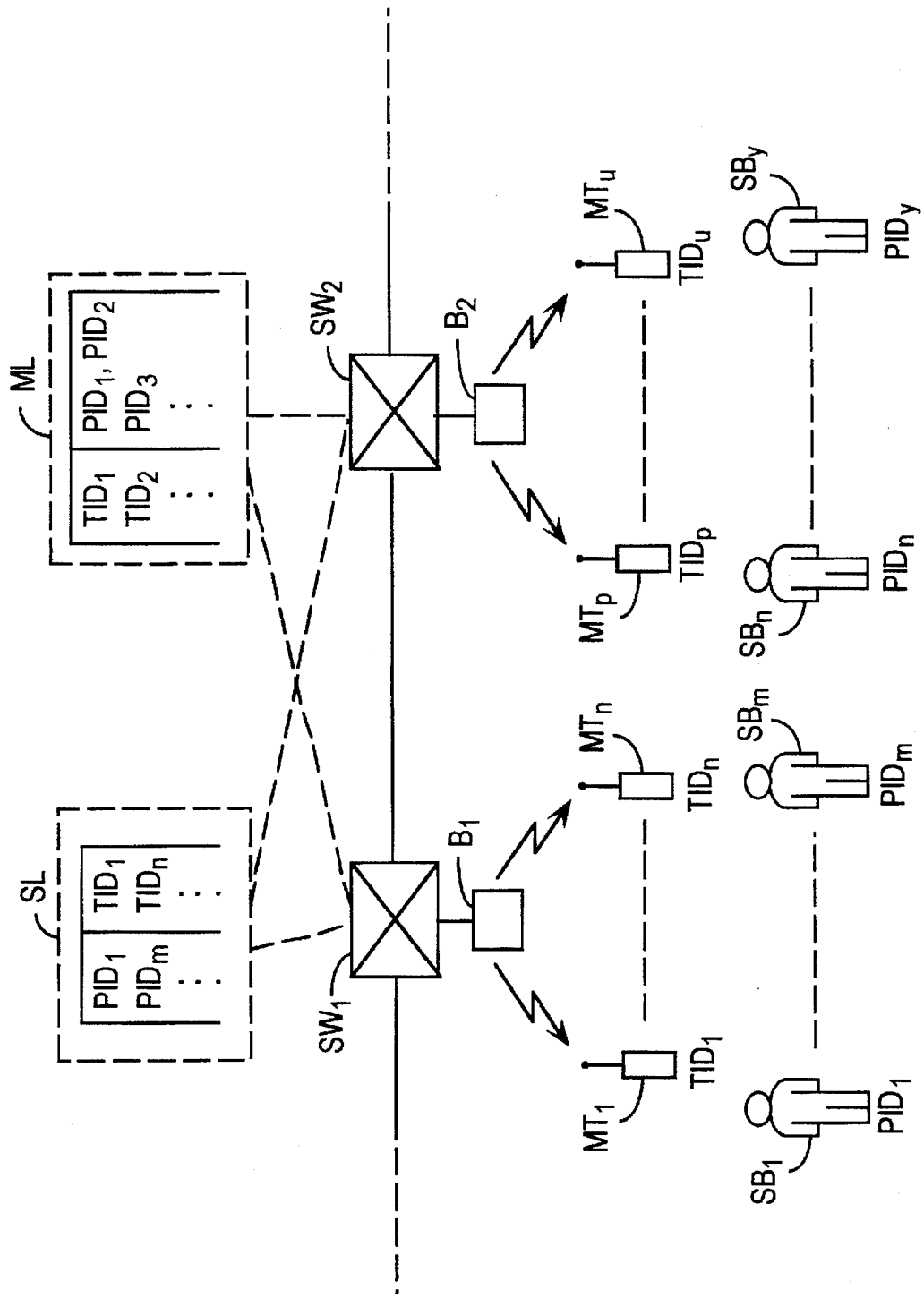
FIG. 9 is a block diagram illustrating the configuration of a communication network to which the control methods according to the fifth and sixth aspects of the invention are applied.

Turning now to FIG. 9, the communication system to which the present invention is applied will be described first. Subscribers $SB_1$ through $SB_m$ and $SB_n$ through $SB_y$ preregister those of mobile units $MT_1$ through $MT_n$ and $MT_p$ through $MT_u$ which they use as terminating terminals, respectively. Switching centers $SW_1$ and $SW_2$ are both allowed to access a subscriber location register SL and a mobile unit location register ML in the communication network. In the subscriber location register SL there are stored identifying numbers $TID_i$ (i=1 through y) of the communication terminals registered by the subscribers $SB_1$ through $SB_m$ and $SB_n$ through $SB_y$ for call terminating use, using their identifying numbers $PID_1$ through $PID_m$ and $PID_n$ through $PID_y$, respectively.

When the originating subscriber $SB_1$ requests the switching center $SW_1$ via the mobile communication terminal $MT_1$ to terminate a call at the subscriber $SB_m$, the switching center $SW_1$ reads out of the subscriber location register SL the identifying number $TID_t$ of the mobile communication terminal $MT_n$ registered by the subscriber $SB_m$ and connects the mobile communication terminal $MT_1$ to the terminal $MT_n$ to call the subscriber $SB_m$, enabling communications between the subscribers $SB_1$ and $SB_m$.

To record data for limiting the number of subscribers that can be registered in one mobile communication terminal $MT_i$ and for removing a certain mobile communication terminal $MT_i$, there is stored in the mobile unit location register ML, using the identifying number $TID_i$ of the mobile communication terminal $MT_i$ as an address, the identifying number $PID_j$ of the subscriber $SB_j$ registered with the terminal $MT_i$. Accordingly, when a request for registration with a certain mobile communication terminal is made, it is possible to determine whether the requested registration is allowed, by immediately detecting in the mobile unit location register ML the current number of registrations with the mobile communication terminal. In the case of removing the mobile communication terminals $MT_i$, the identifying numbers $TID_i$ of the mobile communication terminals $MT_i$ stored in the subscriber location register can all be erased easily by detecting the identifying numbers of all subscribers registered with the communication terminals $MT_i$ from the mobile unit location register and using every subscriber identifying number as an address.

Figure 10:
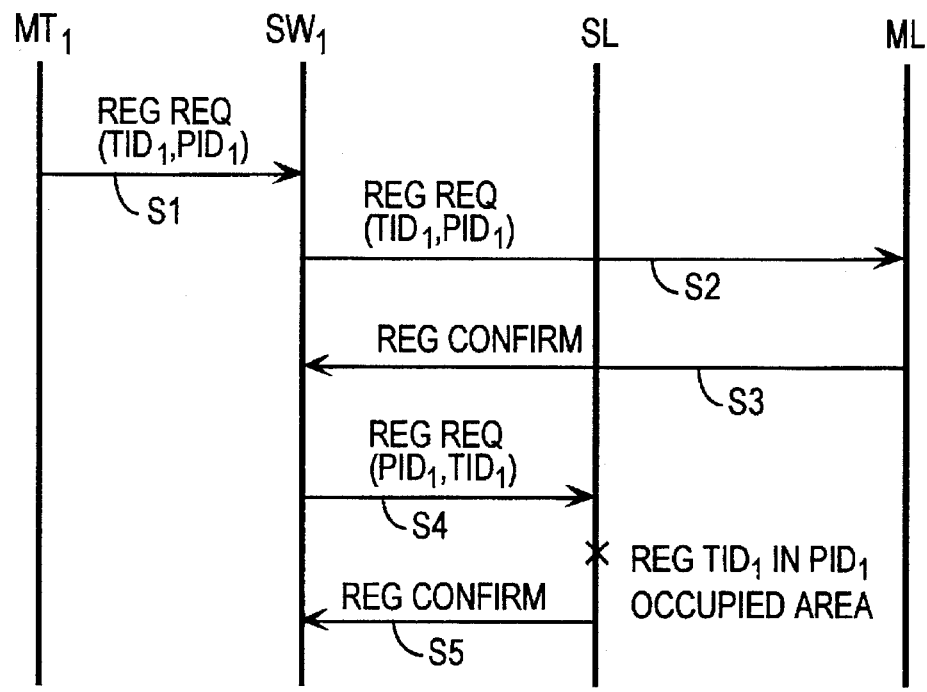
FIG. 10 is a diagram showing a sequence of steps involved in the registration of a subscriber identifying number in FIG. 9.

A description will be given, with reference to FIG. 10, of one possible method which is used to register a mobile communication terminal for call terminating or receiving use in the communication system of FIG. 9. When the subscriber $SB_1$ registers the mobile communication terminal $MT_1$ as a call terminating or receiving terminal, the subscriber $SB_1$ manipulates the terminal $MT_1$ to report therethrough his identifying number $PID_1$ and the identifying number $TID_1$ of the terminal $MT_1$ to the switching center $SW_1$ (S1). The switching center $SW_1$ detects the home network of the terminal $MT_1$ to be registered from its terminal identifying number $TID_1$, on the basis of which the switching center $SW_1$ specifies the address of the mobile unit location register ML, then sends thereto the identifying numbers $TID_1$ and $PID_1$ to make a registration request (S2). The mobile unit location register ML registers the identifying number $PID_1$ in the address area of the identifying number $TID_1$ and sends a registration confirmation signal to the switching center $SW_1$ (S3). Upon receiving the registration confirmation signal, the switching center $SW_1$ detects the subscriber's home network from his identifying number $PID_1$, then based on it, specifies the subscriber location register SL and sends thereto the identifying numbers $PID_1$ and $TID_1$ to registration request (S4). Upon receiving the registration request from the switching center $SW_1$, the subscriber location register SL registers the identifying number $TID_1$ in the address area of the identifying number $PID_1$ and a registration confirmation signal to the switching center $SW_1$ (S5).

Figure 11:
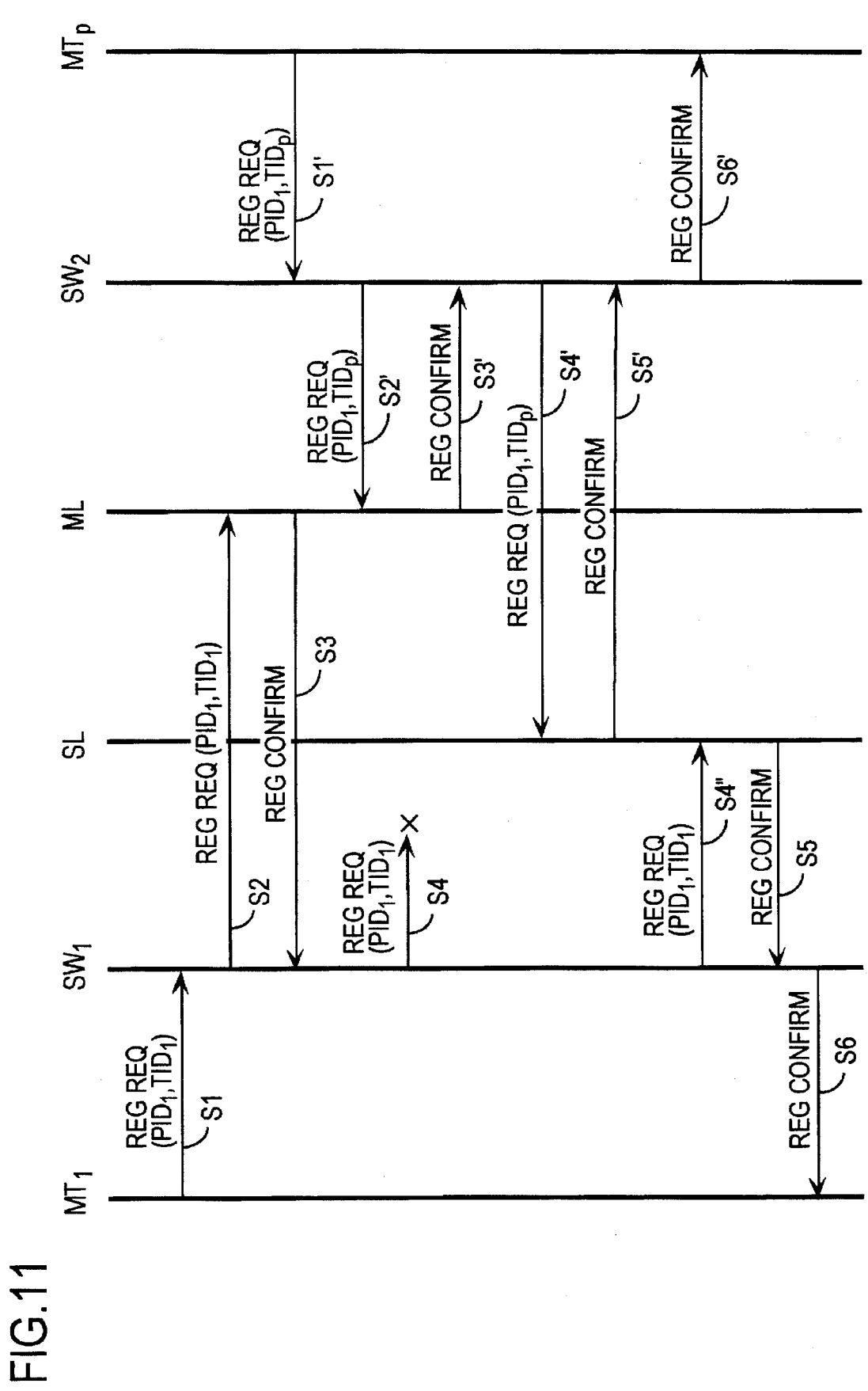
FIG. 11 is a diagram showing a sequence of steps for processing in the case where different terminals compete for the registration of the same subscriber identifying number.

Since a plurality of subscribers may sometimes share the same subscriber identifying number $PID_i$, there are cases where during processing for the terminating or receiving terminal registration by the subscriber $SB_1$ from the mobile communication terminal $MT_1$ for the identifying number $PID_1$, another subscriber $SB_n$ begins the terminating terminal registering operation for the same subscriber identifying number $PID_1$, using another mobile communication terminal $MT_p$. FIG. 11 shows one possible processing sequence that can be used in this instance. By the registration operation from the mobile communication terminal $MT_1$, as is the case with FIG. 10, the registration process proceeds (SL) and the switching center $SW_1$ sends the registration request signal ($PID_1$, $TID_1$) to the mobile unit location register ML (S2), after which the subscriber $SB_n$ performs the operation for registering the subscriber identifying number $PID_1$ with the mobile communication terminal $MT_p$ from the terminal $MT_p$, a registration request signal ($PID_1$, $TID_p$) is sent to the switching center $SW_2$ wherein the mobile communication terminal $MT_p$ is accommodated (S'). Then, as in the case of FIG. 10, the switching center $SW_2$ sends the registration request signal ($PID_1$, $TID_p$) to the mobile unit location register ML (S2') to make therein registration, and upon receiving therefrom a registration confirmation signal (S3'), the switching center $SW_2$ sends the registration request signal ($PID_1$, $TID_p$) to the subscriber location register SL (S4').

On the other hand, when the switching center $SW_1$ sends the registration request signal ($PID_1$, $TID_1$) to the subscriber location register (S4) but fails the registration request, no registration confirmation signal is sent from the subscriber location register SL, and consequently, the switching center $SW_1$ makes again the registration request (S4"). If the switching center $SW_2$ has finished the registration with the subscriber location register SL in this while, the address $TID_p$ of the terminating terminal for the identifying number $PID_1$ is registered with the subscriber location register SL prior to the registration requested from the switching center $SW_1$, then the switching center $SW_1$ makes again the registration request; thus, the mobile unit identifying number $TID_1$ is eventually set, as the terminating terminal for the identifying number $PID_1$, in the subscriber location register SL. In this case, the subscribers $SB_1$ and $SB_n$ are registered with the subscriber location register SL in an order different from that in which they were actually registered with the mobile communication terminals $MT_1$ and $MT_p$, respectively.

As is evident from the above, this communication registration method poses a problem that the order in which registration requests were actually make at terminals differs from the order in which the requesting subscribers are registered with the intra-network location register. That is, in the above case, the subscriber $SB_n$ confirms that the mobile communication terminal $MT_p$ has been registered, as a terminating terminal, for the identifying number $PID_1$, but in practice, the identifying number $TID_1$ is stored in the area $PID_1$ of the subscriber location register SL and the number $PID_1$ is registered for the mobile communication terminal $MT_1$. Suppose that the subscriber $SB_1$ notices an error in selecting the mobile communication terminal immediately after his registration operation for the identifying number $PID_1$ and then again performs the registration operation at once but the registration request failed in the course of processing for the previous registration operation as referred to above. Also in this situation, the request by the second registration operation is registered in the subscriber location register earlier than the request by the first registration operation; consequently, the registration based on the first wrong registration operation is fixed by the above-said second registration request. In this case, however, the subscriber $SB_1$ believes that the registration has been made by the second registration operation.

Figure 12:
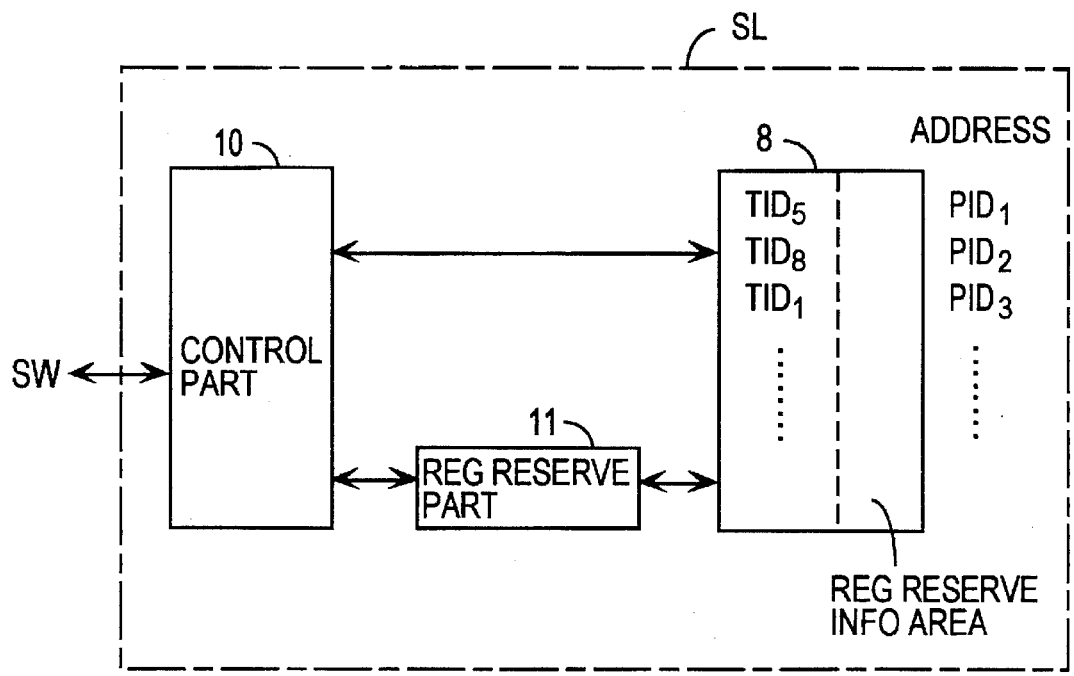
FIG. 12 is a block diagram illustrating the subscriber location register according to the present invention.

In an embodiment of the communication registration control method which solves such a problem as mentioned above, each subscriber location register SL comprises a registered terminal memory 8, a registration reserve part 11 and a control part 10 as depicted in FIG. 12. When receiving a registration reserve request from a switching center SW, the registration reserve part 11 reads out the memory 8, using the subscriber identifying number as the address therefor, and makes a check for registration reserve information indicating a registration reservation. If no registration reserve information is found, the registration reserve part 11 writes registration reserve information in the address and then sends a registration reserve confirmation signal to the switching center. If registration reserve information is found, a registration reservation refuse signal is sent to the switching center. When receiving a registration reservation cancel request from the switching center, the registration reserve part uses the subscriber identifying number to read out the memory 8 and erases the registration reserve information concerned.

Figure 13:
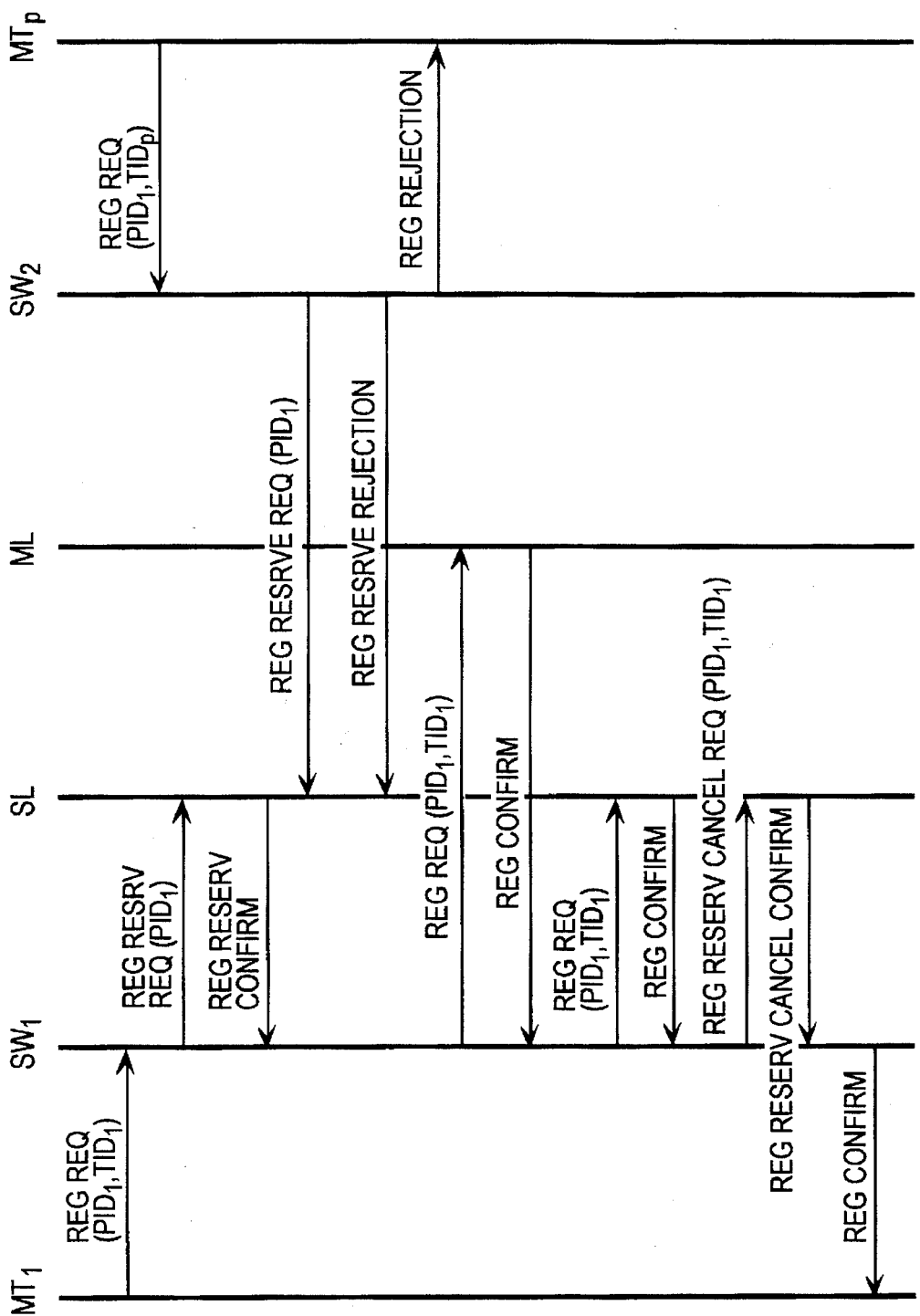
FIG. 13 is a diagram showing a sequence of steps for processing, by the control method according to the present invention, in the case where different terminals compete for the registration of the same subscriber identifying number.

Turning next to FIG. 13, an embodiment of this communication registration control method will be described in connection with the case where during the process for the registration request for the identifying number $PID_1$ by the subscriber $SB_1$ from the mobile communication terminal $MT_1$, the same subscriber $SB_1$ or another subscriber $SB_n$ registers the identifying number $PID_1$ through use of another mobile communication terminal $MT_p$ as in the case of FIG. 11.

When the subscriber $SB_1$ accesses the mobile communication terminal $MT_1$ for registration, the terminal $MT_1$ reports the identifying number $PID_1$ of the subscriber $SB_1$ and the identifying number $TID_1$ of the terminal $MT_1$ to the switching center $SW_1$. Based on the identifying number $PID_1$, the switching center $SW_1$ specifies the subscriber location register SL and sends thereto a registration reservation request with the identifying numbers $PID_1$ and $TID_1$. As shown in FIG. 12, upon receiving the registration reservation request from the switching center $SW_1$ at the control part 10 in the subscriber location register SL, the registration reserve part 11 reads out registration reserve information in the address area of the memory 8 corresponding to the identifying number $PID_1$ and, after confirming that no registration has been reserved, sets registration reserve information to make a reservation and sends a registration reserve confirmation signal to the switching center $SW_1$.

As in the case of FIG. 11, upon receiving the confirmation signal, the switching center $SW_1$ specifies the mobile unit location register ML on the basis of the identifying number $TID_1$ and sends thereto a registration request signal with the identifying numbers $TID_1$ and $PID_1$. The mobile unit location register ML registers the identifying number $PID_1$ in an occupied area of the identifying number $TID_1$ and then sends a registration confirmation signal to the switching center $SW_1$. The switching center $SW_1$ sends a registration request signal to the subscriber location register SL with the identifying numbers $PID_1$ and $TID_1$. In the subscriber location register SL, upon receiving the registration request signal at the control part 10 from the switching center $SW_1$, the identifying number $TID_1$ is registered in the address area of the memory 8 corresponding to the identifying number $PID_1$ and then a registration confirmation signal is sent to the switching center $SW_1$. Upon receiving the confirmation signal, the switching center $SW_1$ sends a registration reservation cancel request to the subscriber location register SL with the identifying numbers $PID_1$ and $TID_1$. In the subscriber location register SL, when the control part 10 receives the cancel request signal from the switching center $SW_1$, the registration reserve part 11 resets the registration reserve information in the address area $PID_1$ of the memory 8 to cancel the reservation for registration and sends a registration reservation cancel confirmation signal to the switching center $SW_1$.

On the other hand, as depicted in FIG. 13, in the case where during the processing for the registration of the identifying number $PID_1$ from the mobile communication terminal $MT_1$, the same subscriber $SB_1$ or a different subscriber $SB_n$ makes a request for the registration of the same identifying number $PID_1$ from a different terminal $MT_p$, the switching center $SW_2$ uses the identifying number $PID_1$ to specify the subscriber location register SL and sends thereto a registration reservation request signal with the identifying numbers $PID_1$ and $TID_1$. In the subscriber location register SL, when the control part 10 receives the registration reservation request signal from the switching center $SW_2$, the registration reserve part 11 reads out registration reserve information in the address area $PID_1$ of the memory 8 to make a check to see if a reservation for registration has already been made. In this case, the reservation has already been made, and consequently, the subscriber location register SL sends a registration reservation refuse signal to the switching center $SW_2$.

As will be appreciated from the above, in this embodiment of the mobile communication registration control method, prior to setting the mobile unit identifying number and the subscriber identifying number in the subscriber location register SL and the mobile unit location register ML, a reservation for registration is made in the subscriber location register SL and during the process for the registration, the registration of the same subscriber identifying number from another mobile communication terminal is refused; hence, the order of registration in the intra-network location register can be made identical with the order of registration requests actually made at the terminals.

In the mobile communication system of FIG. 9, when a plurality of subscribers have registered the same mobile communication terminal as their call receiving terminals, the cancellation of these registrations requires reporting the identifying numbers of all the registered subscribers from the terminals concerned. A description will be given of an embodiment of the mobile communication registration control method according to the sixth aspect of the invention which solves this problem.

In this embodiment, as shown in FIG. 9, the mobile unit location register ML is provided in the mobile communication system and, for each mobile communication terminal, identifying numbers of subscribers who have registered the terminal are stored in the mobile unit location register ML. That is, the subscriber identifying number PID is stored using the mobile unit identifying number TID.

For example, in the case where the subscriber $SB_1$ registers the terminal $MT_1$, as described previously with respect to FIG. 10, when the subscriber $SB_1$ operates the terminal $MT_1$ for registration, the identifying number $PID_1$ of the subscriber $SB_1$ and the identifying number $TID_1$ of the terminal $MT_1$ are sent to the switching center $SW_1$ from the terminal $MT_1$ together with a registration request signal. The switching center $SW_1$ detects the home network of the terminal $MT_1$ from the mobile unit identifying number $TID_1$, then specifies the mobile unit location register ML accordingly and sends thereto a registration request with the identifying numbers $TID_1$ and $PID_1$. The mobile unit location register ML registers (stores) the identifying number $PID_1$ in its address area $TID_1$ and sends a registration confirmation signal to the switching center $SW_1$. Next, the switching center $SW_1$ detects the home network of the subscriber from his identifying umber $PID_1$, then specifies the subscriber location register SL accordingly and sends thereto a registration request signal with the identifying numbers $PID_1$ and $TID_1$. The subscriber location register SL registers (i.e. stores) the identifying number $TID_1$ in its address area $PID_1$ and sends a registration confirmation signal to the switching center $SW_1$.

Figure 14:
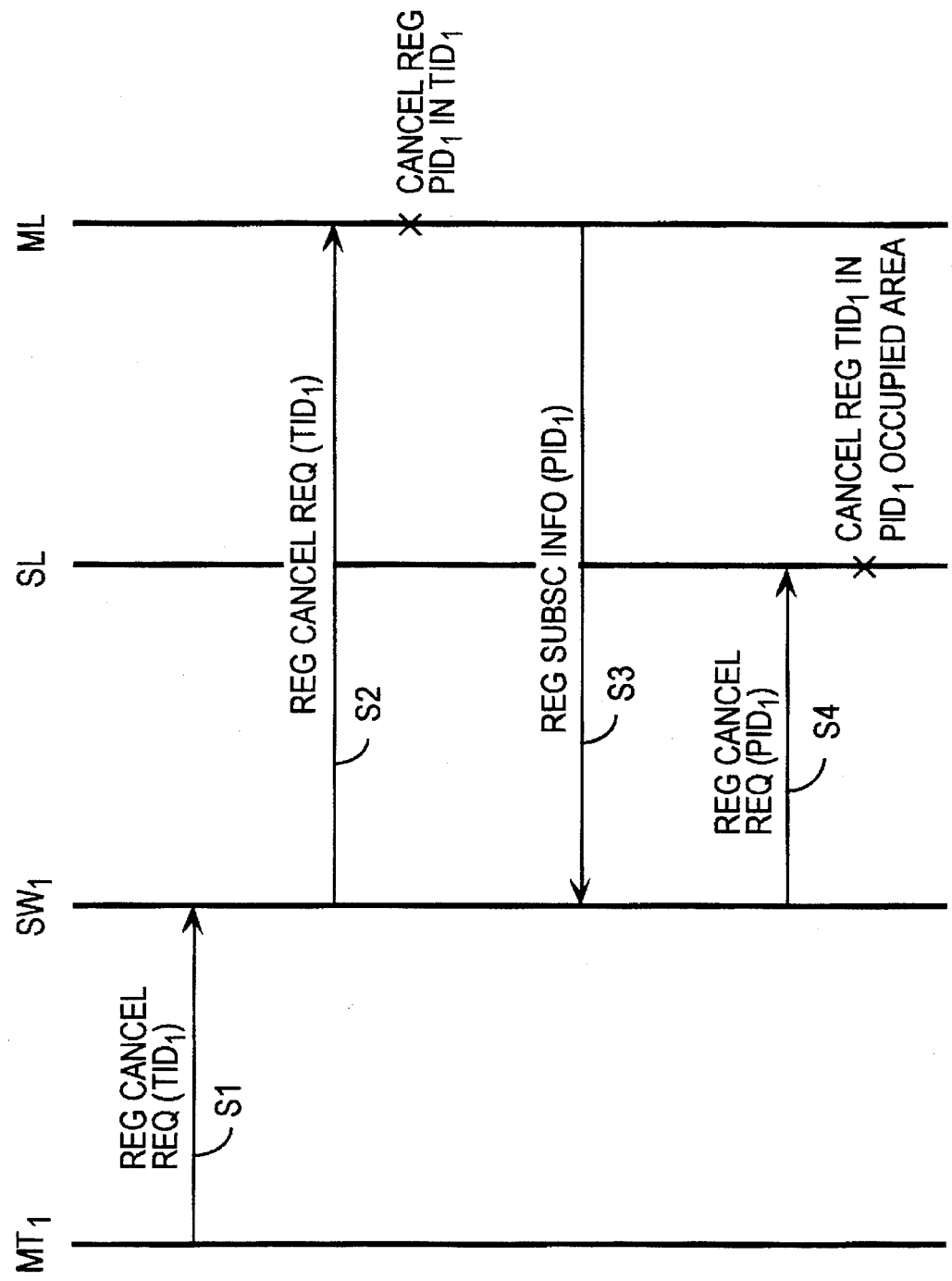
FIG. 14 is a diagram showing a sequence of steps involved in cancelling the registration of a subscriber in a terminal in the communication network configuration of FIG. 9.

Next, a description will be given, with reference to FIG. 14, of processing for cancelling the registration of the subscriber in the mobile communication terminal $MT_1$.

At first, the communication terminal $MT_1$ whose registration is to be cancelled reports its mobile unit identifying number $TID_1$ to the switching center $SW_1$ (S1). The switching center $SW_1$ detects the home network of the terminal $MT_1$ from the identifying number $TID_1$, then specifies the mobile unit location register ML accordingly and sends thereto a registration cancel request signal (S2). The mobile unit location register ML cancels (i.e. erases) the registration of the identifying number $PID_1$ in the address area $TID_1$ and then reports to the switching center $SW_1$ the subscriber identifying number $PID_1$ registered so far (S3). The switching center $SW_1$ detects the home network of the subscriber from the subscriber identifying number $PID_1$, then specifies the subscriber location register SL accordingly and sends thereto a registration cancel request signal (S4). The subscriber location register SL cancel (i.e. erases) the registration of the identifying number $TID_1$ in the address area $PID_1$.

In the case of cancelling the registration of all subscribers registered in the mobile communication terminal $MT_1$, all identifying numbers $PID_1$ in the address area of the mobile unit identifying number $TID_1$ in the mobile unit location register ML are reported to the switching center $SW_1$ in step S3 and the switching center $SW_1$ requests the subscriber location register SL to cancel the registration of the registered terminal identifying numbers $TID_1$ corresponding to these subscriber identifying numbers. Accordingly, it is possible to cancel the registration of all the subscribers in the communication terminal in the communication network by once reporting only the mobile unit identifying numbers to the switching center together with the registration cancel request, without the necessity of sending the registration cancel request signal from the same mobile communication terminal to the switching center for each subscriber concerned.

As described above, according to the registration cancelling method of this embodiment, a mobile location register is provided for storing the subscriber identifying numbers registered for each mobile communication terminal in the network, and the registration of all the subscribers registered in the communication terminal can be cancelled by reporting only its terminal identifying number to the communication network.

The use of such a mobile location register allows ease in limiting the number of subscribers to be registered in each terminal. That is, at the time of registering subscribers, they are registered first in the mobile unit location register; if the number of the registered subscribers does not exceed the limited value, they are allowed to register and after this registration they are registered in the subscriber location register. In this way, the number of registrations for each terminal can be limited with ease.

Incidentally, in each of the communication systems to which the above-described embodiments of the present invention are applied, when the communication terminal is upgraded for enhancement of the system function, the communication procedure of the terminal may sometimes differ from that of the communication network. In the case where a plurality of communication terminals of different communication procedures are mixed in a certain communication network, the communication network is not given any information about the communication procedure of each communication terminal, and hence cannot properly process an originating call and a terminating call for the communication terminal, sometimes failing to perform a call setup process for the terminal. In particular, when the communication network has no information about the communication procedure of a mobile communication terminal having roamed thereto, the call setup process may sometimes become impossible.

Figure 15A:
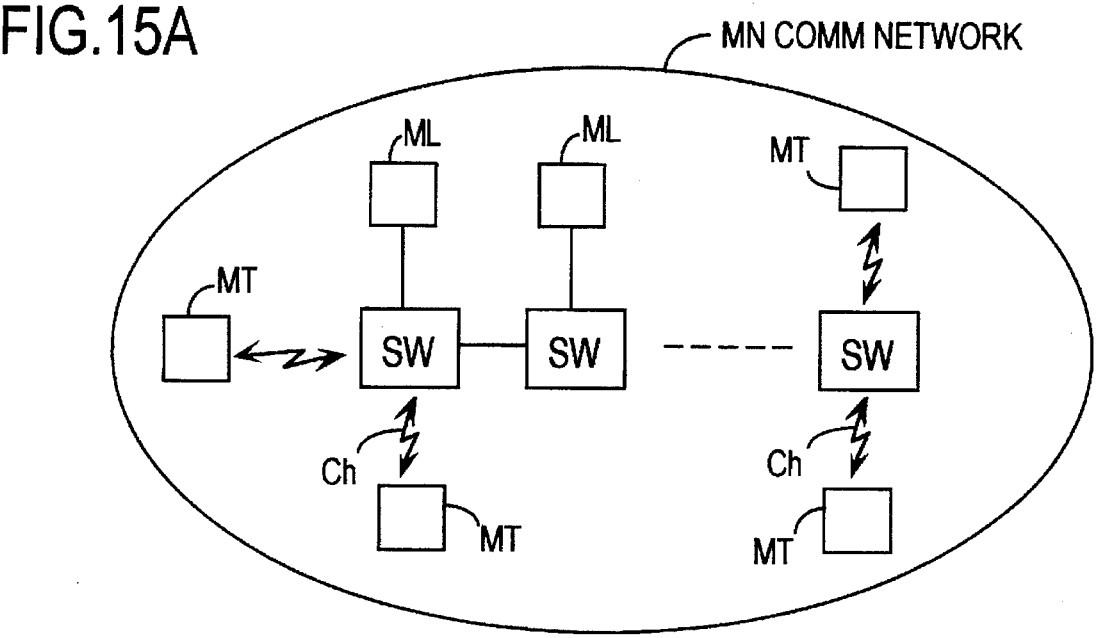
FIG. 15A is a block diagram illustrating an example of the communication network employing the control method according to the seventh aspect of the present invention.

Next, a description will be given an embodiment of the present invention which solves this problem according to the seventh aspect of the invention. As shown in FIG. 15A, there are provided in a communication network, for example, a mobile communication network MN, pluralities of switching centers SW such as subscriber switching centers and transit switching centers. These switching centers are interconnected and communication terminals, that is, mobile communication terminals MT in this example are connected via base stations (not shown) to the switching centers SW over radio channels Ch, enabling communications between the mobile communication terminals and between them and fixed communication terminals.

Figure 15B:
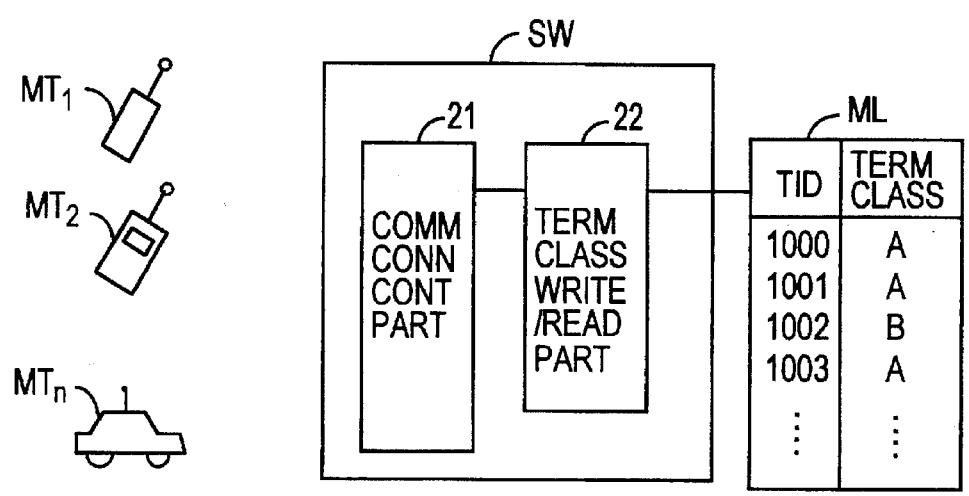
FIG. 15B is a block diagram illustrating the principal part of the communication network.

In this embodiment, a mobile unit location register ML which stores the terminal class for each mobile communication terminal is provided in the mobile communication network MN. That is, as shown in FIG. 15B, there are stored in the location register ML, in pairs, the mobile unit identifying numbers TID of respective mobile communication terminals $MT_1$, $MT_2$, . . . and terminals classes A, B, . . . indicating the communication capabilities (communication procedures, for instance) of the mobile communication terminals. One or more such location registers ML may be provided in the mobile communication network MN or in each subscriber switching center.

The terminal class of each mobile communication terminal MT is stored in the location register ML by the terminal itself via the corresponding switching center SW (usually the subscriber switching center). To this end, a terminal class write/read part 22 is provided in each switching center SW in addition to a communication connection control part 21 which performs, as an ordinary exchange, the communication connection. The terminal class of each mobile communication terminal MT can be written into the location register ML and read out therefrom by the terminal class write/read part 22.

Figure 16A:
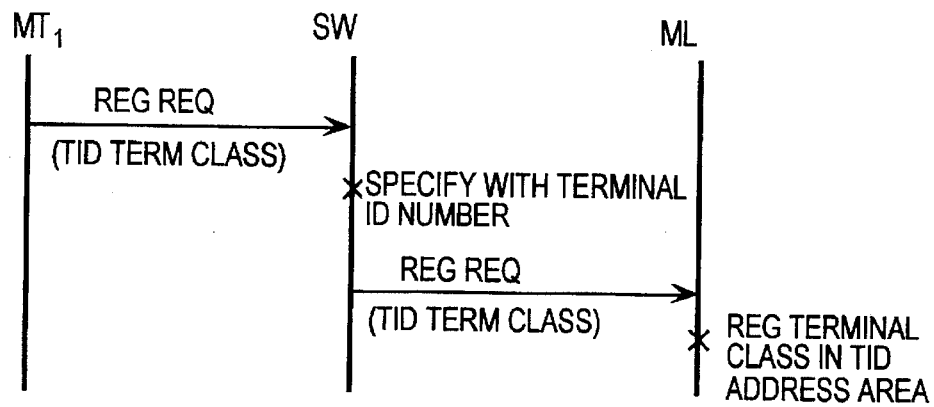
FIG. 16A is a diagram showing an example of the procedure for registration of a terminal class.

The terminal class can be stored by the mobile communication terminal MT into the location register ML. For example, as depicted in FIG. 16A, the mobile communication terminal $MT_1$ transmits its mobile unit identifying number TID and terminal class via a base station (not shown) to the switching center SW to make a request for the registration of the terminal class. The switching center SW receives the request signal, then specifies the location register ML on the basis of the mobile unit identifying number and sends the mobile unit identifying number TID and the terminal class to the location register to make a registration request. The location register ML responds to this registration request to specify an address area for the mobile unit identifying number and registers therein the terminal class. When one location register ML is provided in the mobile communication network, the location register ML need not be specified. In the case of mobile communication, it is also possible to employ a system configuration wherein at the time of location registration of the mobile communication terminal MT, the terminal class is transmitted together with the identifying number indicating the visited zone so that the terminal class is automatically registered. In this case, the location register ML serves also as what is called a home register.

Figure 16B:
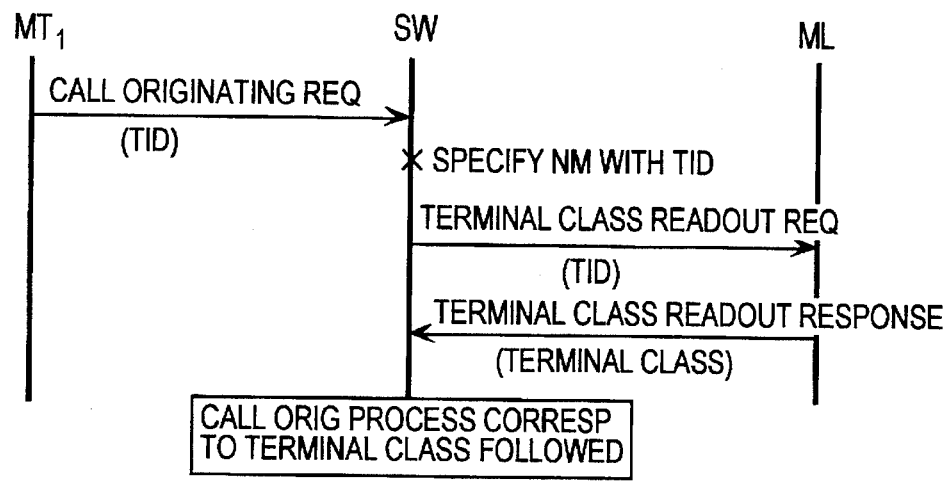
FIG. 16B is a diagram showing an example of an originating call process in the method according to the seventh aspect of the present invention.
Figure 16C:
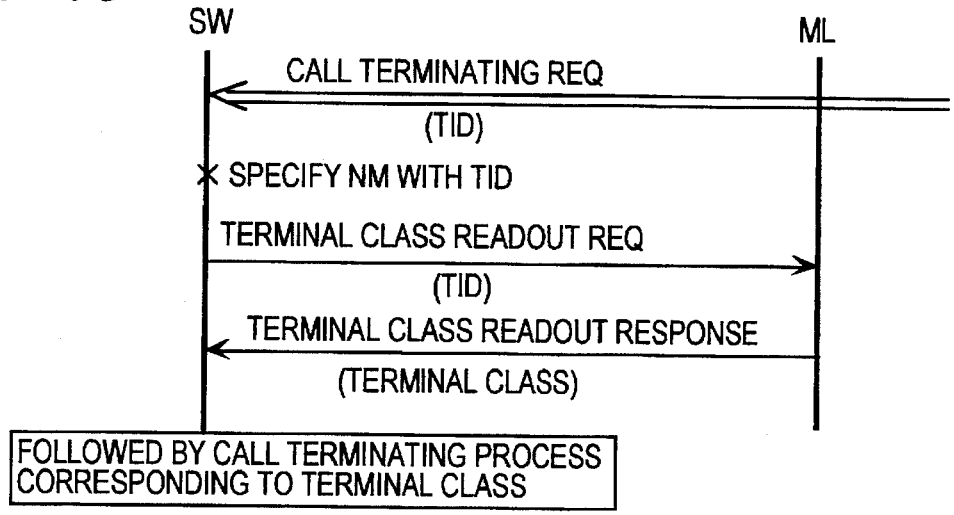
FIG. 16C is a diagram showing an example of a call receiving process in the method according to the seventh aspect of the invention.

In the mobile communication network equipped with the location register ML having stored therein such terminal classes, communications for the mobile communication terminals MT of different communication capabilities can be processed as described below. That is, as shown in FIG. 16B, when the mobile communication terminal $MT_1$ issues a call originating request signal including its mobile unit identifying number TID, the switching center SW having received the request specifies the location register ML on the basis of the mobile unit identifying number and sends thereto a terminal class readout request signal including the mobile unit identifying number TID. Upon receiving the request signal, the location register ML reads out the terminal class corresponding to the mobile unit identifying number and sends it as a terminal class readout response to the requesting switching center SW. The switching center SW performs processing for the call originating request from the mobile communication terminal $MT_1$, following the communication procedure corresponding to the terminal class.

Next, when a call terminating request for the mobile communication terminal $MT_1$ arrives at the switching center SW, that is, when the switching center SW receives a terminating message for the mobile communication terminal $MT_1$, the switching center SW specifies the location register ML on the basis of the mobile unit identifying number and sends thereto a readout request signal including the mobile unit identifying number. The location register ML responds to the request to read out the terminal class corresponding to the mobile unit identifying number and sends it as a terminal class readout response signal to the requesting switching center SW. Then, the switching center SW performs terminating processing for the mobile communication terminal $MT_1$ following the communication procedure corresponding to the terminal class.

As described above, according to this embodiment, the terminal class indicating the communication capability of each mobile communication terminal is stored in the location register in correspondence to each terminal and is read out to perform communication processing for the communication terminal. By this, even if the version of the communication protocols between one mobile communication terminal and the mobile communication network is changed, it is possible to offer communication services to terminals using the previous protocol and to the terminal adopting the new protocol.

We claim:

1. A mobile communication control method for a mobile communication system wherein each communication network is provided with a home location register for storing subscriber contract information, subscriber change information and roaming network information in correspondence to each subscriber using said each communication network as its home network and a visitor location register for storing subscriber contract information and subscriber change information in correspondence to each subscriber not using said communication network as its home network and wherein a switching center in said each communication network performs a call setup process for said subscriber not belonging to said each communication network as its home network, in accordance with said subscriber contract information and said subscriber change information obtained from said visitor location register in said communication network, said method comprising the following steps when said subscriber roams from a first communication network into a second communication network and makes a first location registration in said second communication network:

(A) said subscriber sends into said second communication network a location registration request signal including the identifying number of said subscriber;

(B) said visitor location register in said second communication network sends said location registration request to that home location register of said home network of said subscriber which is specified by said identifying number of said subscriber;

(C) said home location register in said home network sends said subscriber contract information and said roaming network information of said subscriber, as a response signal, to said visitor location register in said second communication network;

(D) said visitor location register in said second communication network stores said received subscriber contract information and sends a change information transfer request signal requesting said subscriber change information of said subscriber, to said visitor location register in said first mobile communication network specified by said roaming network information;

(E) said visitor location register in said first mobile communication network sends said subscriber change information of said subscriber to said visitor location register in said second communication network and deletes said subscriber change information from storage; and (F) said visitor location register in said second communication network stores said received subscriber change information.

2. A communication control method for a mobile radio communication system wherein each mobile communication network includes at least one switching center and a subscriber location register and a mobile unit location register connected to said switching center, said subscriber location register of said each mobile communication network has stored therein subscriber information and roaming network information of each subscriber using said each mobile communication network as its home network, and said mobile unit location register of said each mobile communication network has stored therein roaming network information of a mobile unit using said mobile communication network as its home network and subscriber identifying information of a subscriber having registered with each mobile unit for call terminating use, said each mobile unit and said each subscriber being given a mobile unit identifying number and a subscriber identifying number of their home networks, respectively, said method comprising the following steps which are performed when said mobile unit roams from a first mobile communication network into a second mobile communication network and makes a first location registration in said second mobile communication network:

(A) said mobile units sends into said second mobile communication network a location registration request signal including said mobile unit identifying number of said mobile unit;

(B) said mobile unit location register in said second mobile communication network obtains, on the basis of said received location registration request signal, said roaming network information of said mobile unit representing said first mobile communication network from said mobile unit location register of said home network of said mobile unit;

(C) said mobile unit location register in said second mobile communication network obtains said subscriber identifying number of said subscriber having registered with said mobile unit for call receiving use, from said mobile unit location register in said first mobile communication network indicated by said roaming network information; and (D) said subscriber location register in said second mobile communication network obtains said subscriber information of each subscriber having registered with said mobile unit for call receiving use, from said home network of said each subscriber specified by said identifying number of said each subscriber.

3. The method of claim 2, wherein said step (D) for said subscriber location register to obtain said subscriber identifying information further includes the following steps:

(D-1) said subscriber sends into said second communication network a location registration request signal including said subscriber identifying number of said subscriber;

(D-2) a visitor location register in said second communication network sends said location registration request signal to a home location register in said home network of said subscriber specified by said subscriber identifying number;

(D-3) said home location register in said home network sends subscriber contract information and said roaming network information of said subscriber, as a response signal, to said visitor location register in said second communication network;

(D-4) said visitor location register in said second communication network stores said subscriber contract information sent thereto and sends a change information transfer request signal requesting subscriber change information, to a visitor location register in said first mobile communication network specified by said roaming network information;

(D-5) said visitor location register in said first communication network sends said subscriber change information of said subscriber to said visitor location register in said second communication network and deletes said subscriber change information from storage; and (D-6) said visitor location register in said second communication network stores said sent subscriber change information.

4. A communication control method for a mobile communication system wherein each communication network is provided with a subscriber location register connected to a switching center, said subscriber location register having stored therein subscriber information corresponding to each subscriber using said each communication network as his home network, and said switching center performs a call setup process for said each subscriber in accordance with said subscriber information, said method comprising the following steps:

(A) said switching center in each visited network sends a subscriber information readout request signal to said subscriber location register in response to a call originating request signal from said each subscriber, said request signal including a subscriber identifying number;

(B) said subscriber location register determines if it has information corresponding to said subscriber identifying number included in said subscriber information readout request signal and, if it has, then reads out and sends said information to said switching center, and if not, said subscriber location register transfers said subscriber information readout request signal to said subscriber location register of a home network of said subscriber indicated by said subscriber identifying number;

(C) said subscriber location register in said home network reads out subscriber information corresponding to said subscriber identifying number included in said subscriber information readout request signal and sends said read-out subscriber information to said subscriber location register in said visited network of said subscriber;

(D) said subscriber location register in said visited network sends to said switching center in said visited network said subscriber information received from said subscriber location register in said home network; and (E) said switching center in said visited network performs a call originating process in response to said call originating request signal from said subscriber, in accordance with said subscriber information received from said subscriber location register in said visited network.

5. The method of claim 4, wherein said subscriber is a roaming subscriber; said subscriber location register connected to said switching center has stored therein said subscriber information and roaming network information of said subscriber; said step (C) includes a step wherein it is determined if said roaming information corresponding to said subscriber identifying number is present and, if present, said subscriber information readout request signal is transferred to a communication network indicated by said roaming network information, said method further comprising a step wherein said communication network indicated by said roaming network information reads out subscriber information corresponding to said subscriber identifying number included in said subscriber information readout request signal sent thereto and sends said read-out subscriber information to said subscriber location register in said home network of said subscriber.

6. A communication control method for a mobile communication system wherein each communication network is provided with: a switching center for interconnecting a plurality of terminals; a subscriber location register connected to said switching center for storing an identifying number of a communication terminal registered by each subscriber for call terminating use; and a mobile unit location register for storing an identifying number of each subscriber having registered each communication terminal for call terminating use; and wherein when receiving a call terminating request including an identifying number of a subscriber designated as the destination of a terminating call, said switching center reads out, on the basis of said identifying number, said identifying number of said communication terminal registered by said designated subscriber from said subscriber location register and performs terminating connection to said communication terminal; said method comprising the following steps:

(A) a subscriber sends, from said communication terminal to said switching center, a registration request signal including a subscriber identifying number and a mobile unit identifying number;

(B) upon reception of said registration request signal from said subscriber, said switching center sends said registration request signal as a registration reservation request signal to said subscriber location register;

(C) upon each reception of said registration reservation request signal, said subscriber location register determines if a registration reservation has already been stored corresponding to said subscriber identifying number included in said request signal and, if stored, sends a reservation reject signal to said switching center and, if not stored, stores a reservation for registration in correspondence to said subscriber identifying number and sends a reservation confirmation signal to said switching center;

(D) upon receiving said reservation confirmation signal, said switching center sends a registration request signal including said mobile unit identifying number and said subscriber identifying number, to said mobile unit location register and registers the identifying number of said subscriber;

(E) said mobile unit location register stores said subscriber identifying number corresponding to said mobile unit identifying number included in said registration request signal sent thereto and sends a registration confirmation signal to said switching center;

(F) upon receiving said registration confirmation signal from said mobile unit location register, said switching center sends a registration request signal including said subscriber identifying number and said mobile unit identifying number, to said subscriber location register;

(G) said subscriber location register registers said mobile unit identifying number included in said registration request signal in correspondence to said subscriber identifying number in said registration request signal and then sends to said switching center a signal confirming the registration of said mobile unit identifying number;

(H) upon receiving said confirmation signal, said switching center sends a signal to said subscriber location register to cancel the reservation for registration; and (I) said subscriber location register cancels the reservation for registration.

7. The method of claim 6, which further includes the following steps for cancelling the registration of said communication terminal for call terminating use:

(J) said communication terminal sends to said switching center a registration cancel request signal including the mobile unit identifying number of said communication terminal;

(K) said switching center sends said registration cancel request signal to said mobile unit location register;

(L) said mobile unit location register reads out a subscriber identifying number corresponding to said mobile unit identifying number in said registration cancel request signal, sends said read-out subscriber identifying number to said switching center and deletes said subscriber identifying number registered in said mobile unit location register in correspondence to said mobile unit identifying number;

(M) said switching center sends to said subscriber location register a registration cancel request signal including said subscriber identifying number received from said mobile unit location register; and (N) said subscriber location register deletes said mobile unit identifying number registered therein in correspondence to said subscriber identifying number included in said registration cancel request signal.

8. A mobile communication control method wherein each of plural communication networks accommodates a switching center and a plurality of communication terminals, including plural mobile units, of different communication capabilities and, when receiving a terminating call for a mobile unit in each network, the switching center obtains mobile location information of said mobile unit by reference to a mobile unit location register and alerts said mobile unit; said method comprising the steps of:

(A) registering, from each communication terminal, a terminal class, indicating the communication capability of said each communication terminal, in a mobile unit location register in correspondence to said each communication terminal;

(B) registering in a subscriber location register, in correspondence to each of a plurality of subscribers, an identifying number of a mobile unit which receives a call for each subscriber; and (C) when receiving a terminating call for said each subscriber, said switching center detects said registered mobile unit identifying number by reference to said subscriber location register and a visited area of said mobile unit and the terminal class thereof by reference to said mobile unit location register and alerts said mobile unit according to said terminal class.

* * * * *